(12) United States Patent
Szeto

(10) Patent No.: US 12,184,143 B2
(45) Date of Patent: Dec. 31, 2024

(54) LINEAR ACTUATOR WITH REACTIVE FORCE PATH

(71) Applicant: TITAN HAPTICS INC., Mississauga (CA)

(72) Inventor: Timothy Jing Yin Szeto, Mississauga (CA)

(73) Assignee: TITAN HAPTICS INC., Missussauga (CA)

( * ) Notice: Subject to any disclaimer, the term of this patent is extended or adjusted under 35 U.S.C. 154(b) by 0 days.

(21) Appl. No.: 17/852,920

(22) Filed: Jun. 29, 2022

(65) Prior Publication Data

US 2022/0329141 A1 Oct. 13, 2022

Related U.S. Application Data

(63) Continuation of application No. PCT/CA2021/051066, filed on Jul. 29, 2021.

(60) Provisional application No. 63/058,555, filed on Jul. 30, 2020.

(51) Int. Cl.
*H02K 41/02* (2006.01)

(52) U.S. Cl.
CPC .................................. *H02K 41/02* (2013.01)

(58) Field of Classification Search
CPC ...... H02K 41/02; H02K 41/03; H02K 41/031; H02K 41/033; H02K 33/16; H02K 33/02; H02K 35/06; H02K 35/02
USPC ............ 310/12.01, 14, 12.16, 12.31, 23, 30, 310/36–37
See application file for complete search history.

(56) References Cited

U.S. PATENT DOCUMENTS

| 6,326,706 | B1 * | 12/2001 | Zhang | F04B 35/045 |
| | | | | 310/12.32 |
| 7,859,144 | B1 * | 12/2010 | Sahyoun | H02K 33/16 |
| | | | | 335/229 |
| 9,716,423 | B1 * | 7/2017 | Szeto | H02K 33/16 |
| 2009/0218892 | A1 * | 9/2009 | Schrader | H02K 41/0352 |
| | | | | 310/12.24 |
| 2011/0210689 | A1 | 9/2011 | Vogel | |
| 2011/0210690 | A1 * | 9/2011 | Vogel | G02B 23/2476 |
| | | | | 310/14 |

(Continued)

FOREIGN PATENT DOCUMENTS

| CN | 1291035 A | 4/2001 |
| DE | 102006006877 A1 | 8/2007 |

(Continued)

*Primary Examiner* — Michael Andrews
(74) *Attorney, Agent, or Firm* — Alexandre Daoust; Norton Rose Fulbright Canada LLP

(57) ABSTRACT

A linear actuator comprising a mass movably mounted in a linear displacement path, the mass having a magnetic segment, a drive force generator configured to selectively impart acceleration to the mass in the orientation of the linear displacement path, and a reactive force path generating a return force when the mass is displaced from a rest position. The return force being in the orientation of the linear displacement path and towards the rest position, the amplitude of the return force varying as a function of the position of the mass in the linear displacement path in accordance with a force response curve, the reactive force path including a permanent magnet force element disposed transversally adjacent to the linear displacement path and magnetically coupled with the magnetic segment.

7 Claims, 19 Drawing Sheets

(56) References Cited

U.S. PATENT DOCUMENTS

2019/0050056 A1 2/2019 Szeto et al.
2021/0131492 A1* 5/2021 Tangudu ............. F16C 32/0459

FOREIGN PATENT DOCUMENTS

| EP | 0594757 | 5/1994 |
| EP | 1992057 B1 | 4/2014 |
| JP | 2010035315 A | 2/2010 |
| JP | 2016509461 A | 3/2016 |

* cited by examiner

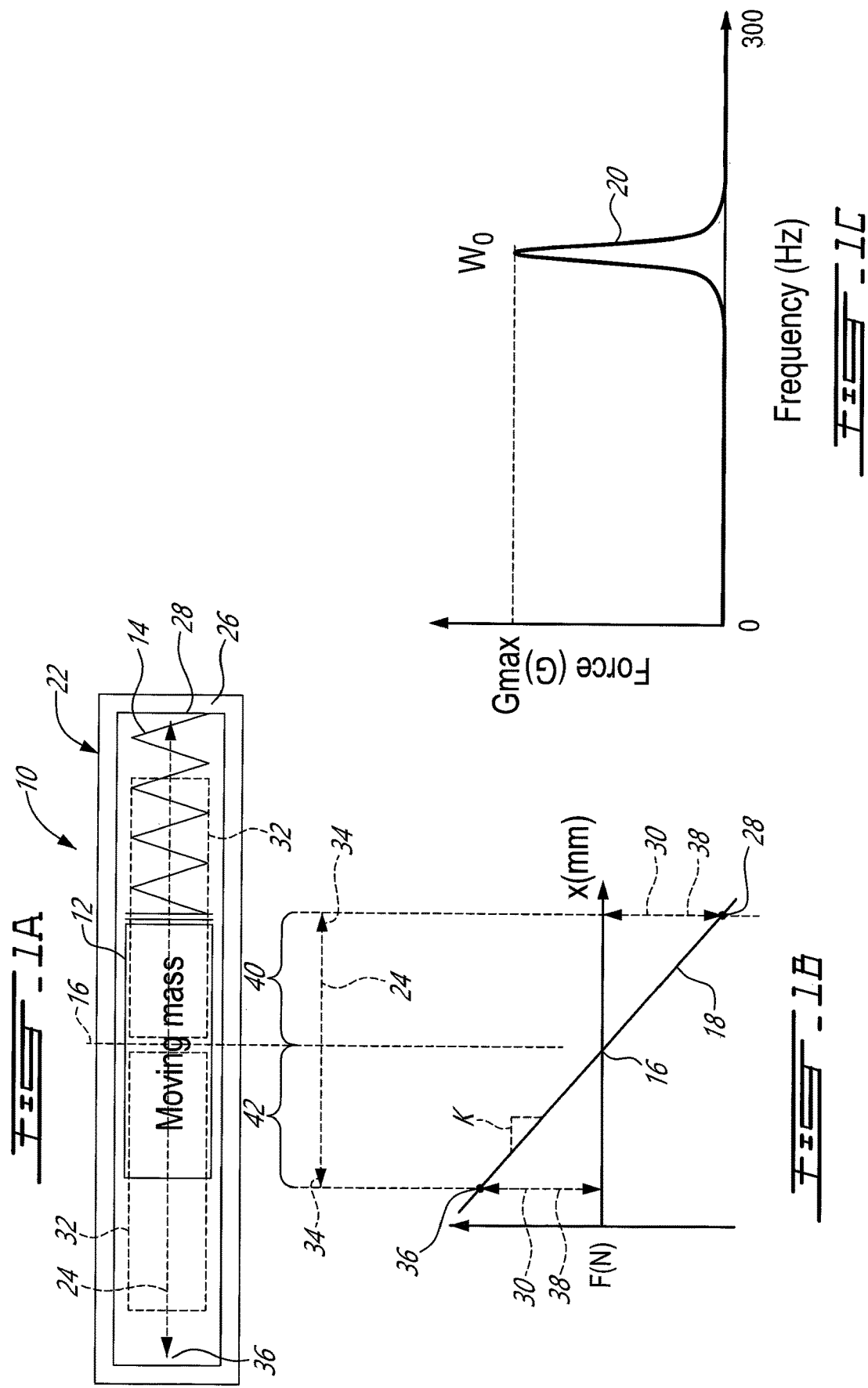

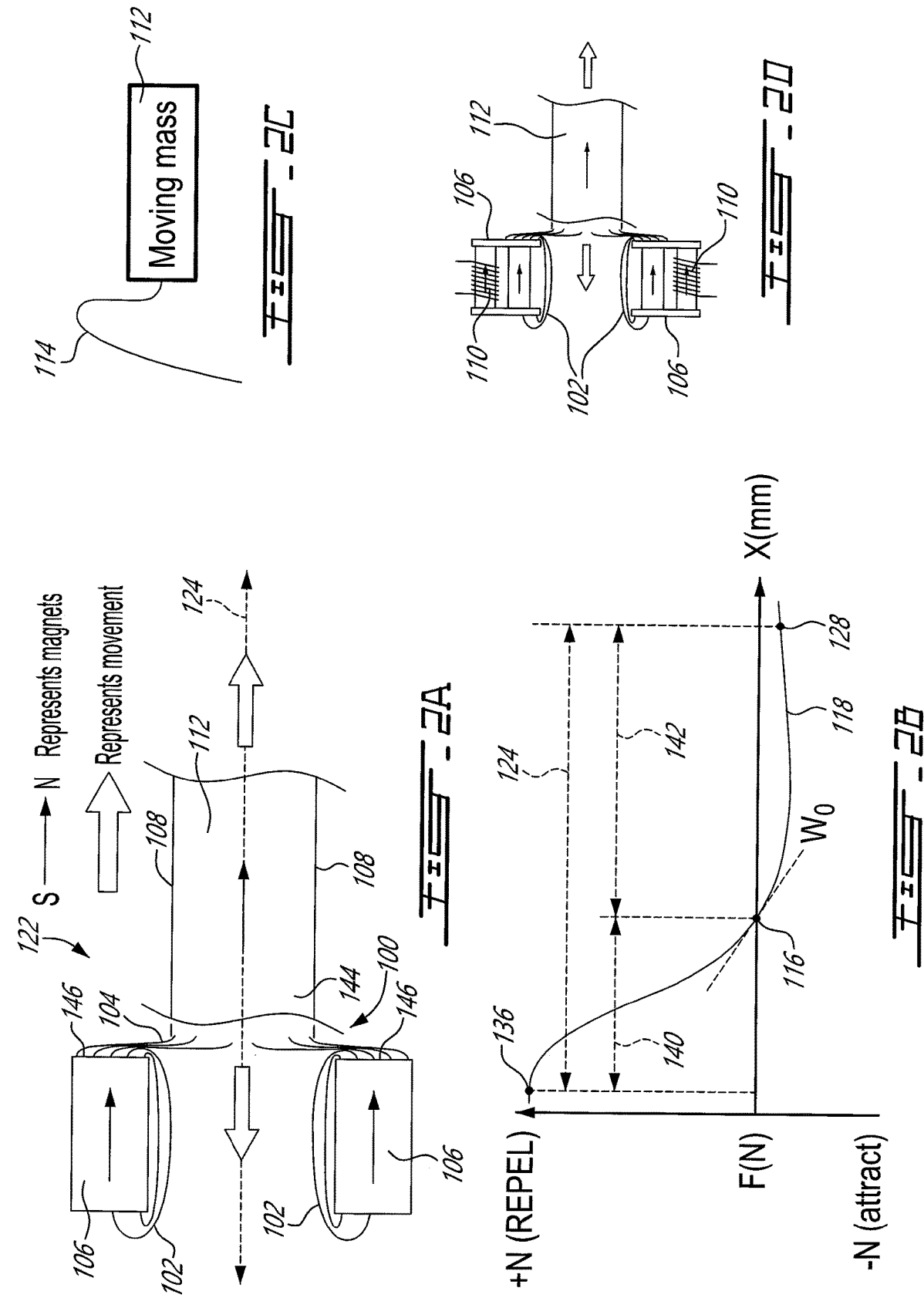

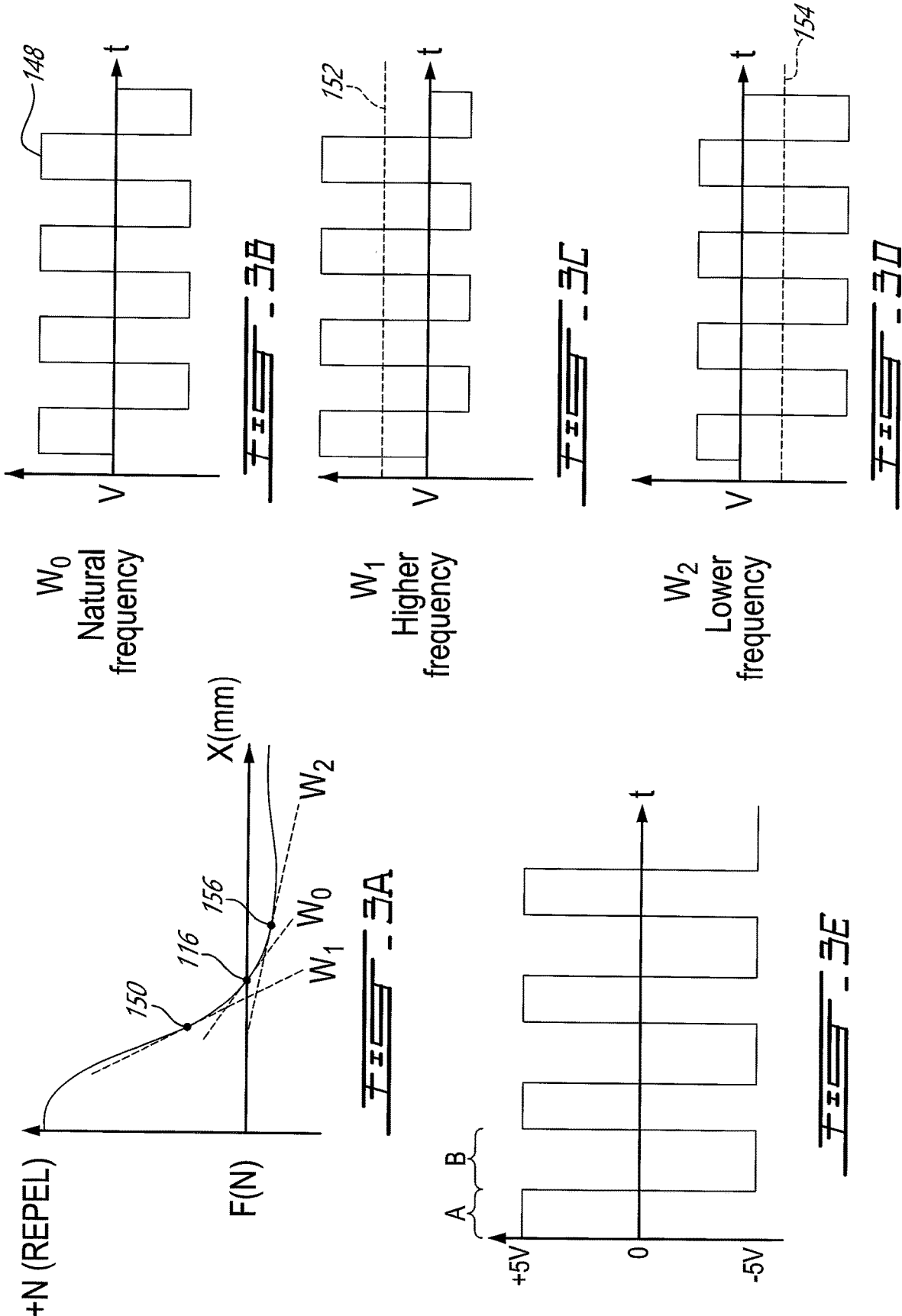

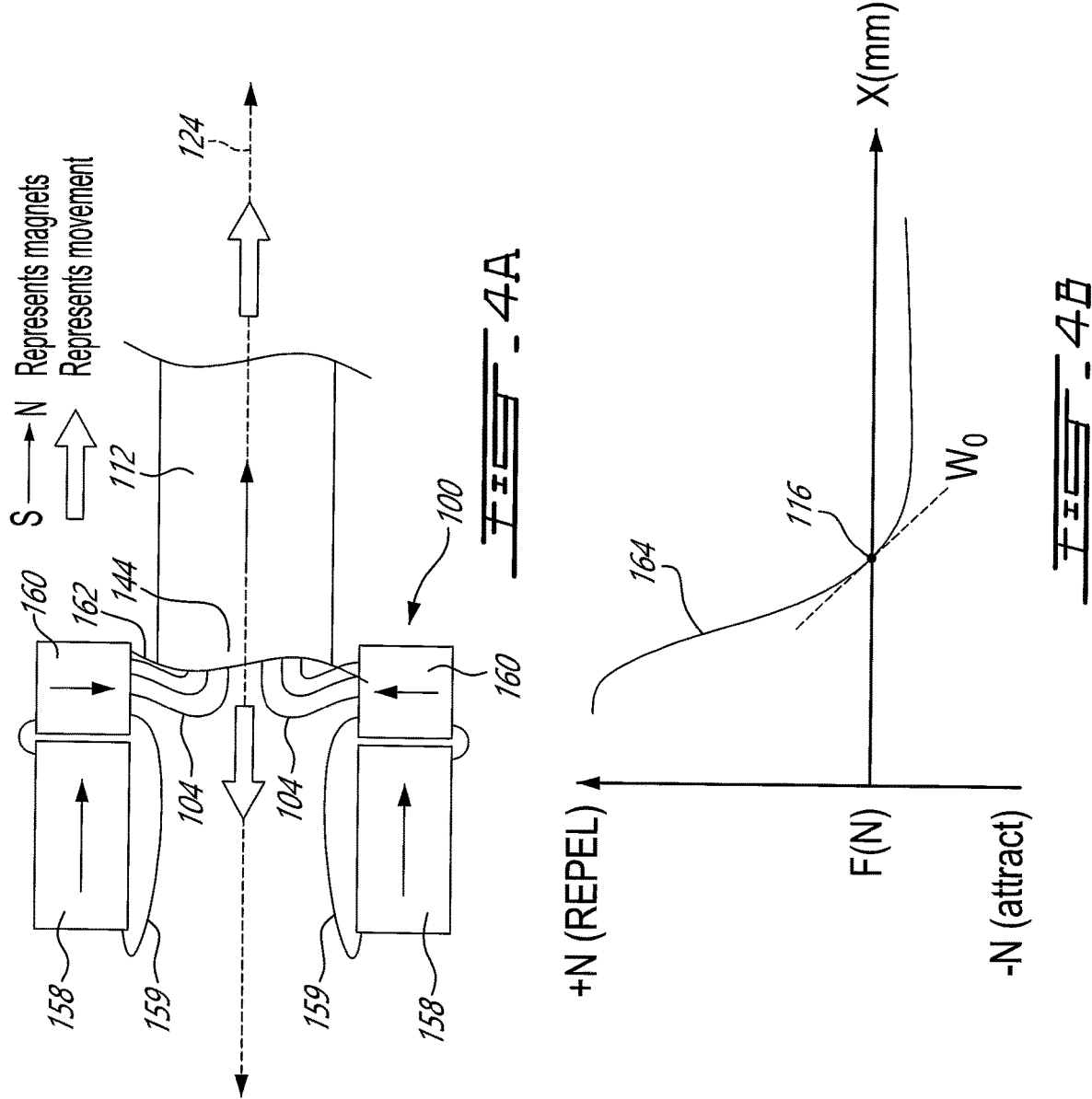

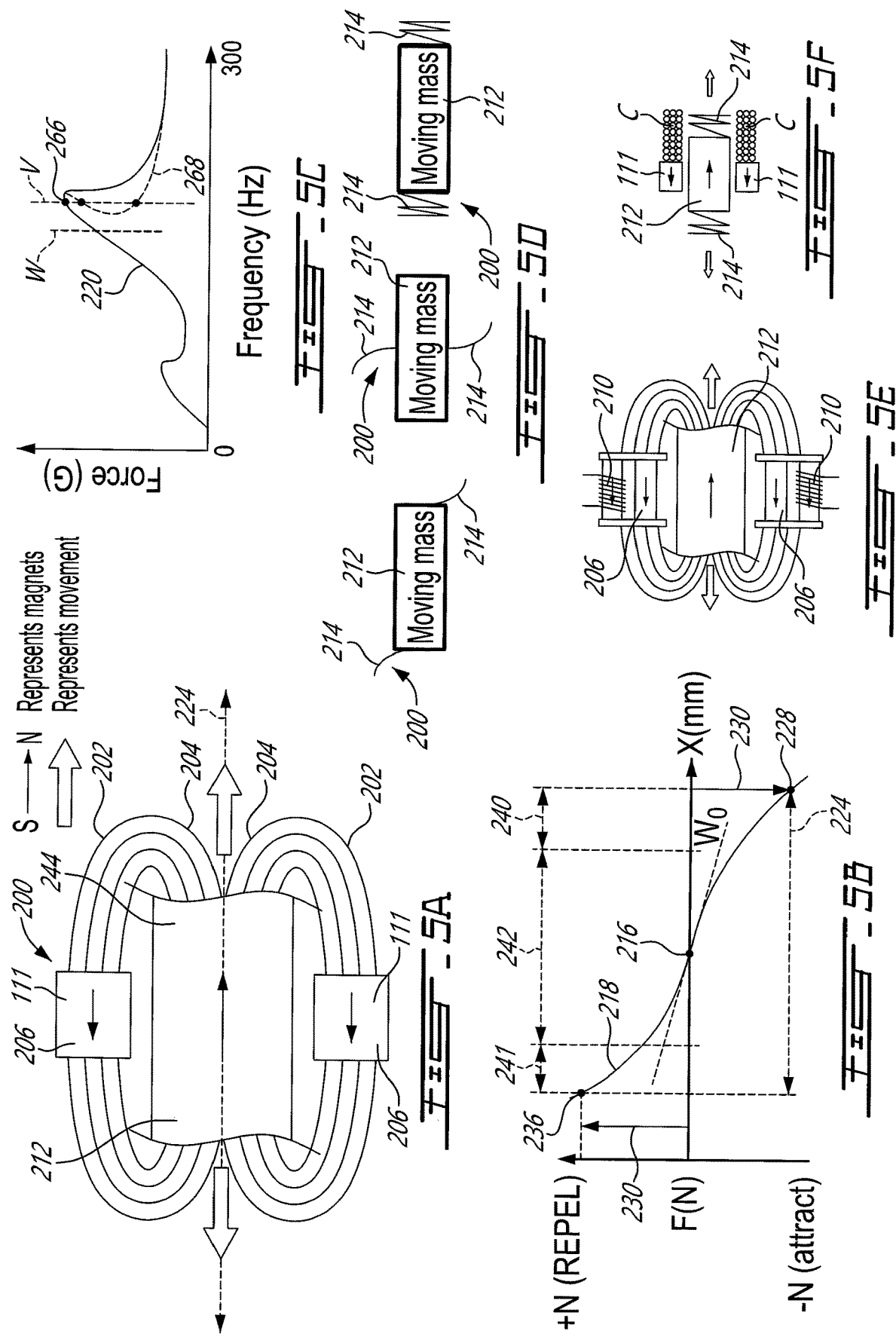

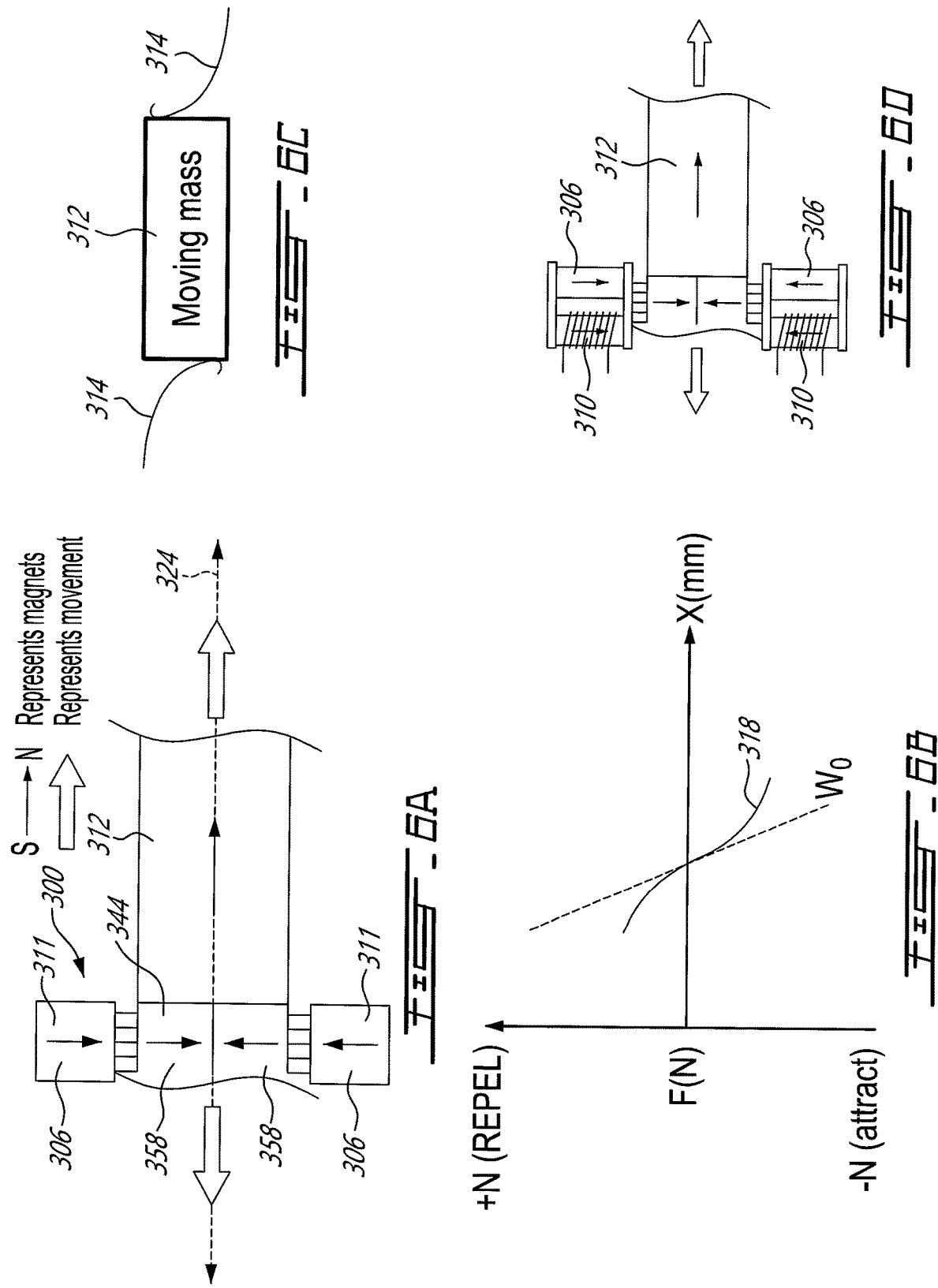

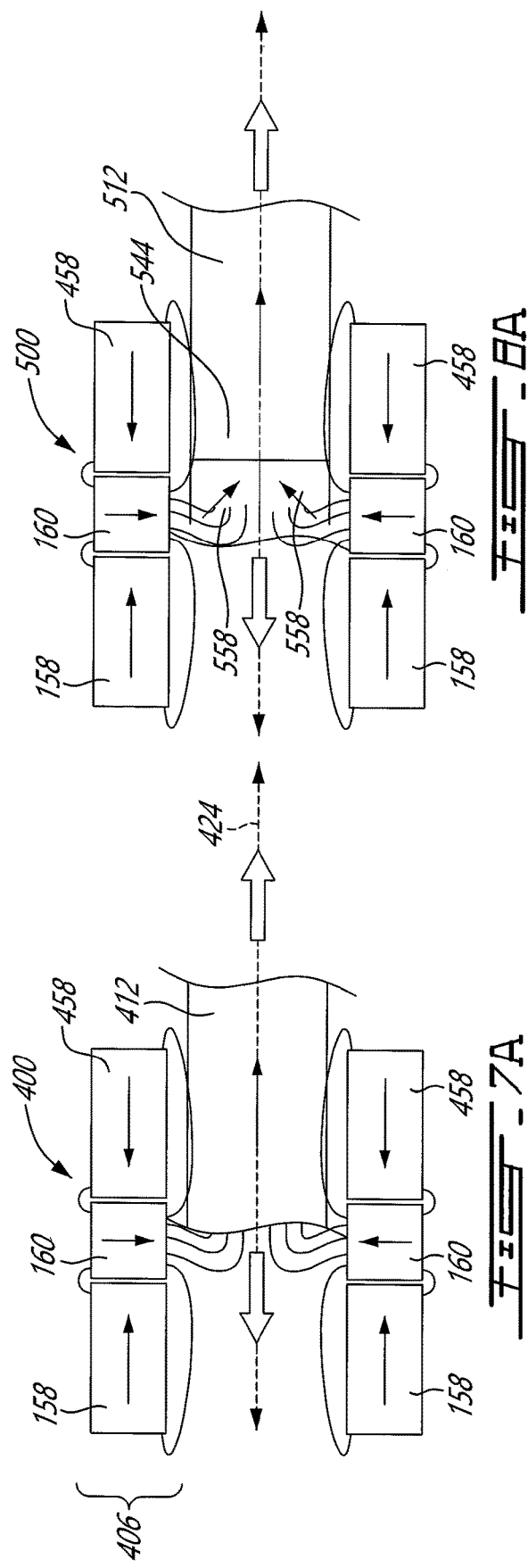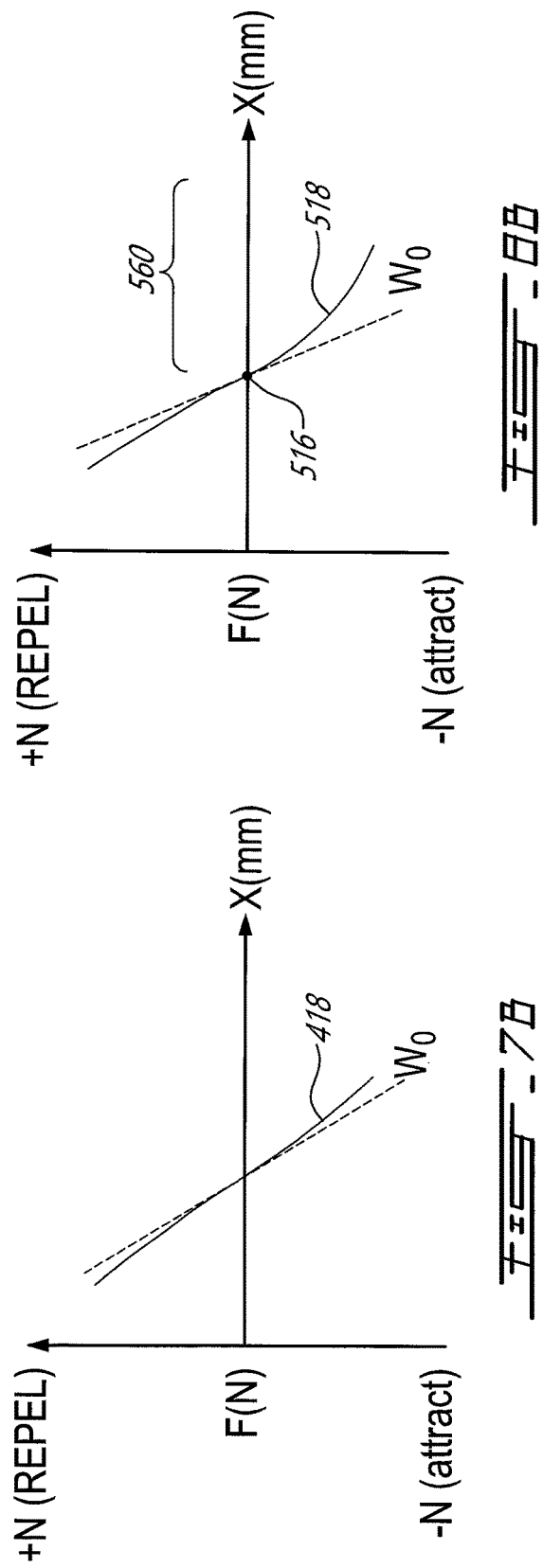

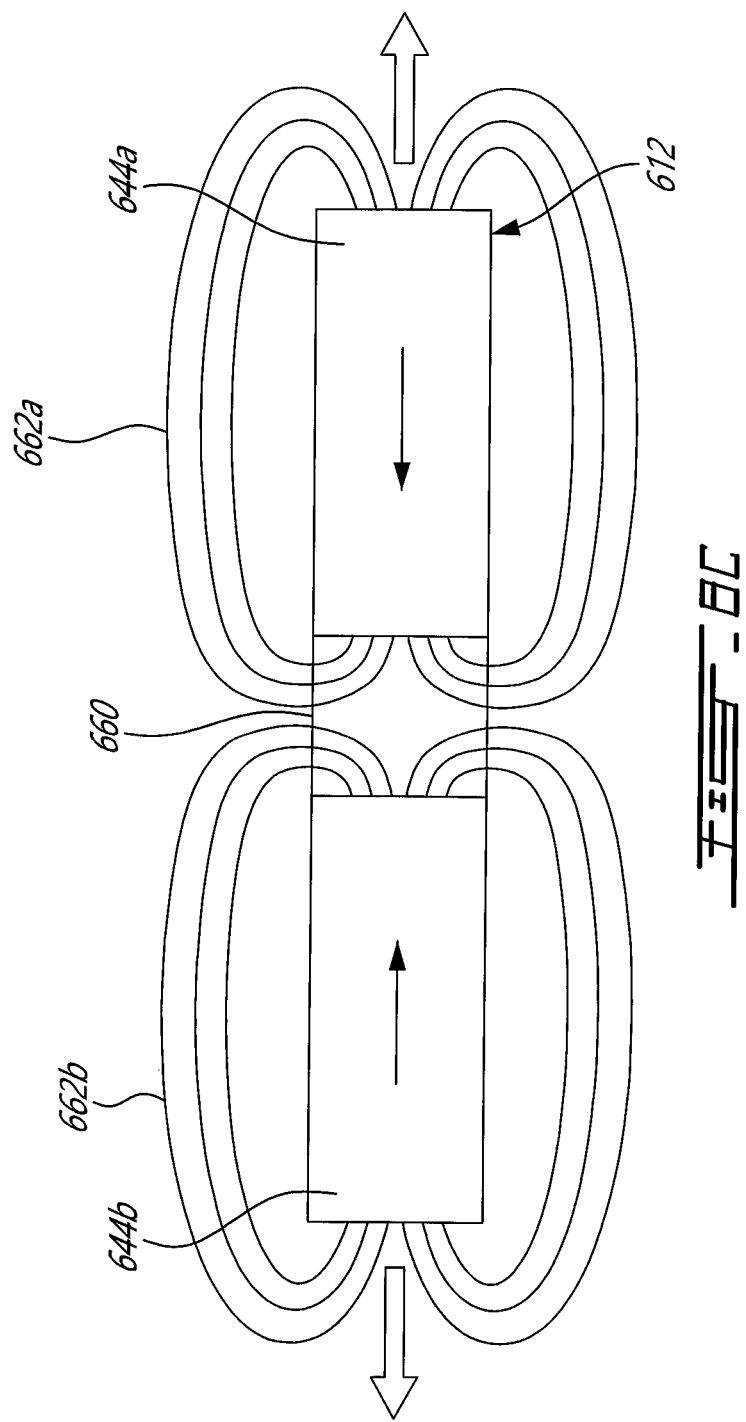

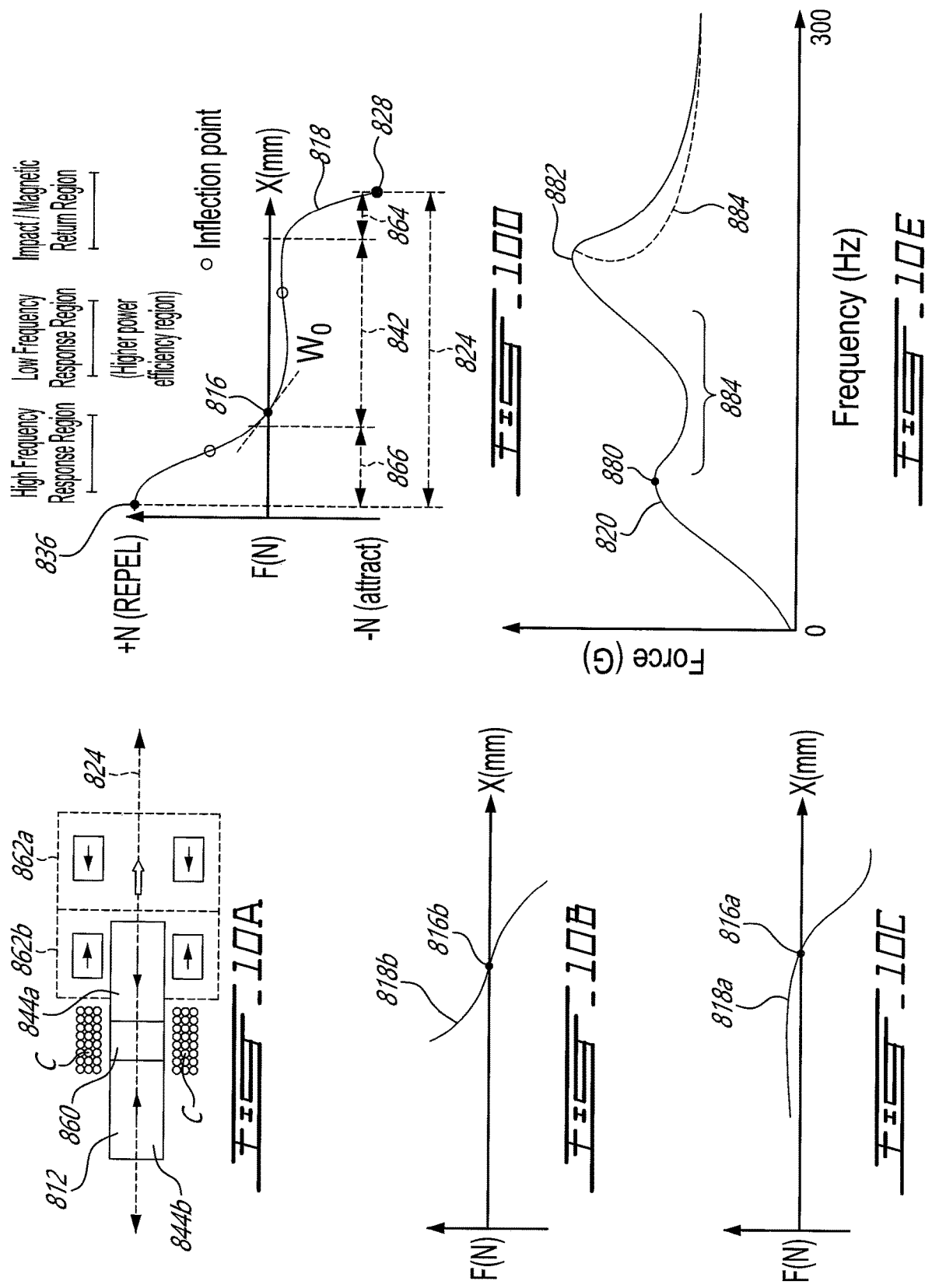

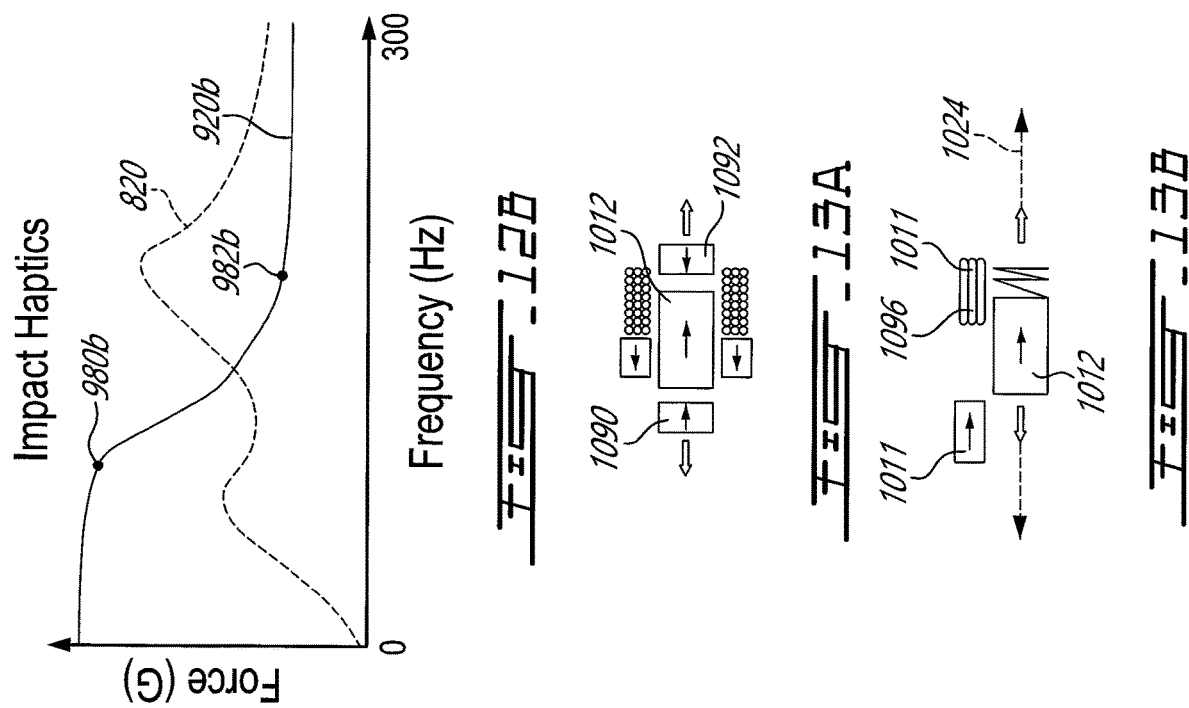
FIG. 12B
FIG. 13A
FIG. 13B
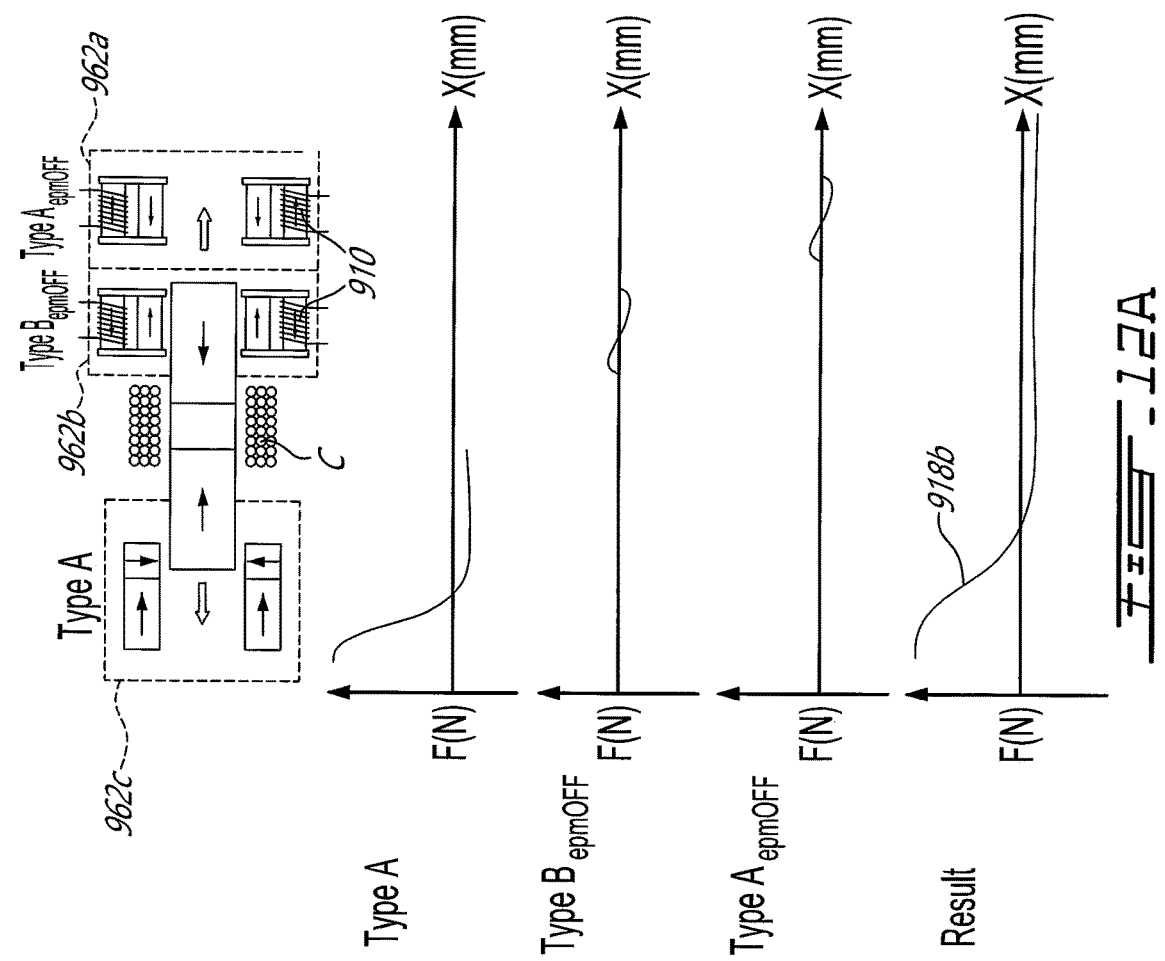
FIG. 12A

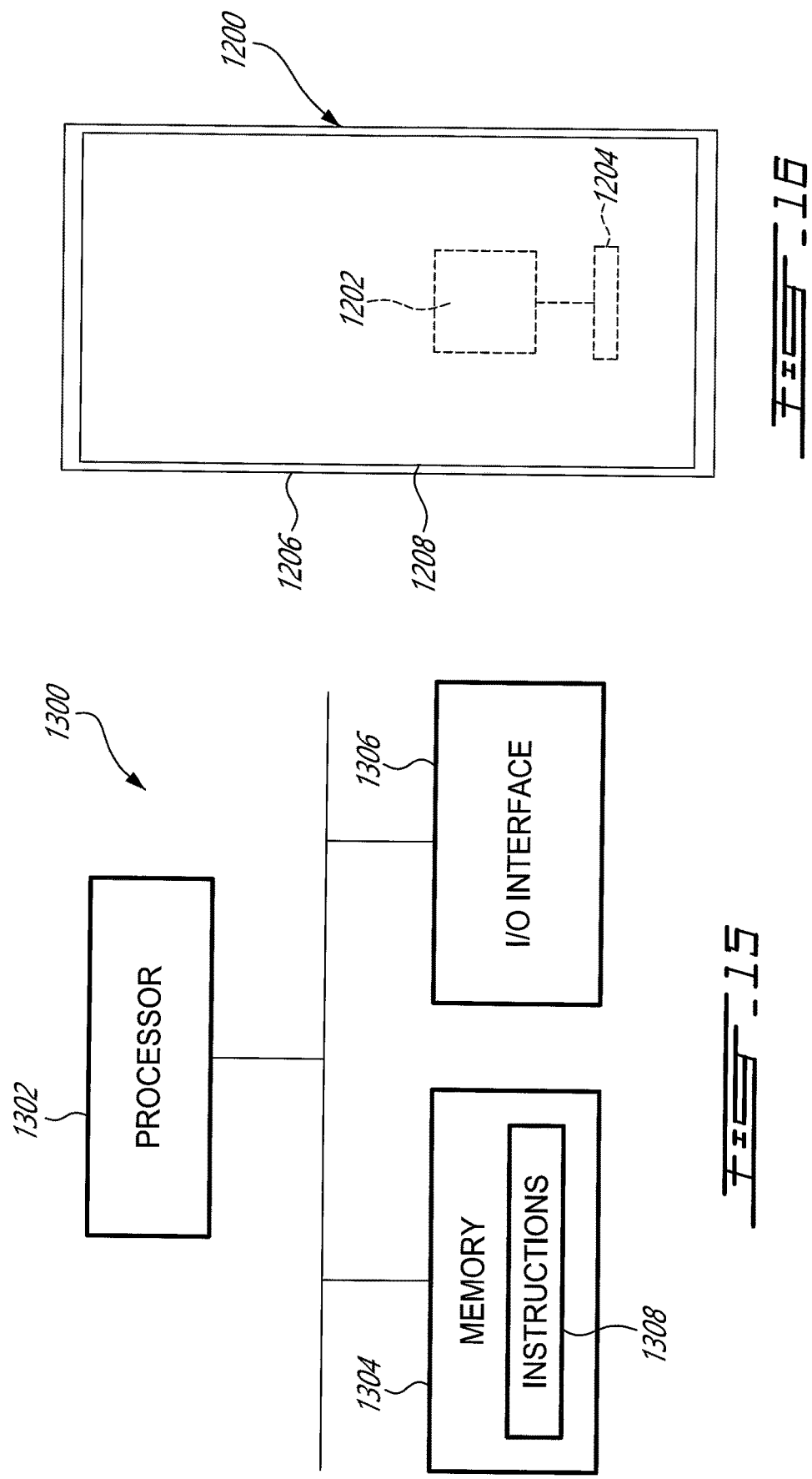

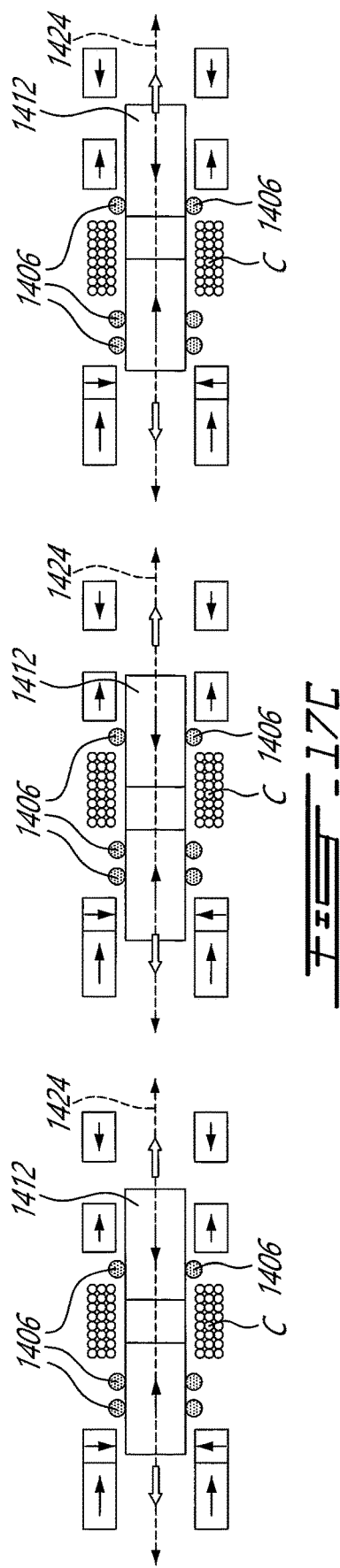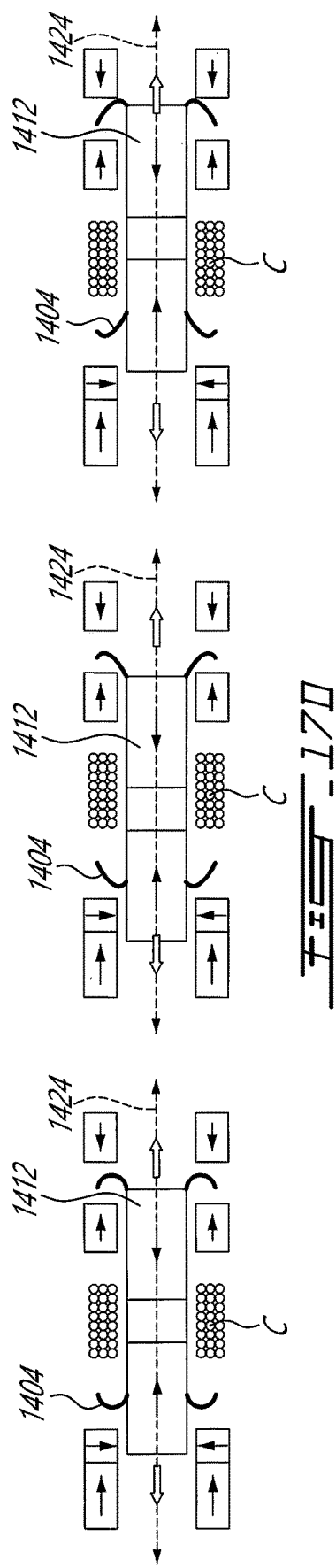

LINEAR ACTUATOR WITH REACTIVE FORCE PATH

CROSS-REFERENCE TO RELATED APPLICATIONS

This is a continuation application claiming the benefit of PCT Application No. PCT/CA2021/051066, filed on Jul. 29, 2021, which claims the benefit of U.S. Provisional Patent Application No. 63/058,555, filed on Jul. 30, 2020. The entire contents of the above-identified applications are incorporated by reference herein.

BACKGROUND

Many types of linear actuators exist. Linear actuators typically involve some form of mass which is movable back and forth in a linear path. The linear path is typically straight, but there can be some cases where the linear path is curved. Some linear actuators, such as haptic actuators for instance, are configured to generate acceleration forces. Perhaps the most well known example of acceleration forces is vibrations, but many other types of acceleration forces or sequences of acceleration forces are possible. Such linear actuators can have a reactive force path, e.g. a path which causes a progressively varying force response as the mass is moved within it, away from an equilibrium position or zone, and a drive force generator which can be independent from the reactive force path. The mass can be free to move linearly, such as by being movably mounted along some form of linear guide for instance, except for the forces exerted on it by the drive force generator and the reactive force path (and a typically minimized amount of friction). Although existing linear actuators were satisfactory to a certain degree, there always remains room for improvement.

SUMMARY

The reactive force path can stem from one or more springs, one or more magnet (in combination with a magnetized mass), one or more stop(s), or a combination of springs, stop(s) and magnets for instance. The drive force generator can stem from electrically driving an electromagnet (coil) if the mass is magnetized, for instance. Different types of force elements such as magnets and springs can have respective advantages and inconveniences relative to one another, and the choice of using one or the other can depend on the specificities of a given embodiment.

In the case of haptics actuators of the linear actuator type, it can be desired that the force response curve generated by the reactive force path exhibits a return force when the mass is moved away from an equilibrium position or zone. It can further be desired that the reactive force path be configured to contain the mass in scenarios where a maximum amount of inertia is imparted to the mass by the drive force generator. One way to achieve this is to produce a reactive force which progressively increases with the distance from the equilibrium position or zone.

FIG. 1A shows a simplified sketch showing a simple case of a system 10 having a mass 12 held by a spring 14 which can operate in compression or extension as the mass 12 is moved away from the equilibrium position 16. FIG. 1B is an example of a force response curve 18 associated to the system 10 of FIG. 1A.

When the mass 12 is driven to oscillate by a drive generator (not shown) operating at a given frequency, it will oscillate at the driving frequency. However, the mass 12 in FIG. 1A is a harmonic oscillator which has a natural frequency $W_0$. If the driving frequency is close to the natural frequency, or coincides with the natural frequency, a resonant behavior will be observed and a significantly greater amplitude of oscillation, and thus of acceleration response, will be observed due to this resonant behavior. The frequency spectrum 20 of the acceleration response for a linear actuator having a linear force curve such as shown in FIG. 1B is presented in FIG. 1C. The frequency spectrum 20 represents the level of acceleration (Force in Gs) which will be exhibited for a mass 12 driven at a given drive amplitude, for different drive frequencies. The resonance frequency $W_0$ is directly tied to the slope k of the linear force response curve 18.

In the case of haptic actuators, for instance, it is typically sought to maximize the acceleration response of the mass 12 within existing constraints. In the case of a linear force response curve 18 such as shown in FIG. 1B, the linear actuator can exhibit a frequency response spectrum 20 such as shown in FIG. 1C, which can be seen to be centered on a natural frequency $W_0$, and which can be said to have a resonance at the natural frequency $W_0$. The mass 12 will tend oscillate significantly and exhibit stronger variations in acceleration when driven at a frequency corresponding to the natural frequency $W_0$ due to resonance at that frequency, but oscillate much less, and thus generate less acceleration, if driven at other frequencies. The value of the natural frequency $W_0$ is tied to the slope k of the force response curve 18. In the case of a haptic actuator, for instance, it could be preferable for the frequency response to be more versatile and less centered on a single resonance frequency, for instance. In one example, it can be desired to use a single make of haptic actuator to operate with a variety of electronic device models, each of which has different drive frequencies. Narrowband frequency response spectrums such as shown in FIG. 1C may not satisfactorily meet this need and may require to adapt the spring constant to the drive frequency of the specific device, for instance. Narrowband frequency response spectrums may also not allow significantly different frequencies of haptics signals, for instance.

In other, different examples, other areas for improvement can be sought, such as reducing production cost, or improving scalability, acceleration response or reliability, or simply providing new types of force response curves or frequency response spectrums, to name a few examples.

In accordance with a first aspect, there is provided a linear actuator having a magnetized mass, and at least one magnet configured to interact with the magnetized mass in contributing to define the force response curve. The at least one magnet can be disposed transversally adjacent to the linear displacement path of the mass. Indeed, the force response curve stemming from a magnet disposed adjacent to the linear displacement path can be significantly different from a force response curve stemming from a magnet disposed at an end of the linear displacement path, and the difference can be harnessed in producing new and advantageous force response curves at least in some applications. Alternately, providing a magnet disposed adjacent to the linear displacement can simply provide an advantageous alternative to positioning a magnet at the end at the linear displacement path, which can allow to limit the length of the footprint of the linear actuator in a scenario where limited length a requirement, for instance. Still alternately, providing a magnet disposed adjacent to the linear displacement path can be used to offer a very strong return force when the magnetized portion of the mass is disposed adjacent to a magnet having the same magnetic orientation as the magnetized portion of the mass, or otherwise provide an alternative means of contributing to or defining a force response curve.

Accordingly, in accordance with a first aspect, there is provided: a linear actuator comprising a mass movably mounted in a linear displacement path, the mass having a permanent magnetic field, a drive force generator configured to selectively impart acceleration to the mass in the orientation of the linear displacement path, and at least one magnet disposed transversally adjacent to the linear displacement path in a manner to interact with the magnetic field of the mass and generate a magnetic force therewith, the amplitude of the magnetic force varying depending of the position of the mass in the linear displacement path in accordance with a force response curve.

In accordance with a second aspect, there is provided a linear actuator having a reactive force path defining a force response curve having a plateau or relatively stable, non-zero return force response between two relatively spaced-apart points of inflexion, each point of inflexion preceding a zone of significant increase of the return force, and one of which being associated to a point of zero force or rest position. This can be achieved by using a sequence of resilient members to define the reactive force path and a mass having two oppositely oriented magnetized portions.

Accordingly, in accordance with a second aspect, there is provided: a linear actuator comprising a mass movably mounted in a linear displacement path, a drive force generator configured to selectively impart a drive force to the mass in the orientation of the linear displacement path, and a reactive force path generating a return force on the mass in the orientation of the linear displacement path, the amplitude of the return force varying as a function of the position of the mass in the linear displacement path in accordance with a force response curve, the force response curve having regions of increasing return force associated to opposite ends of the linear displacement path, one of which leading to a point of maximal return force, and a plateau region of non-zero return force located between the regions of increasing return force, the non-zero return force being of between 5 and 30% of the maximal return force over a distance greater than a length of either region of increasing return force.

Accordingly, in accordance with another aspect, there is provided a linear actuator comprising a mass movably mounted in a linear displacement path, a drive force generator configured to selectively impart a drive force to the mass in the orientation of the linear displacement path, and a reactive force path configured to impart a return force on the mass in the orientation of the linear displacement path, the mass having a permanent magnetic field generated by a first and a second magnetized portions longitudinally interspaced from one another and each having an individual magnetic field, the magnetic fields of the two magnetized portions being oriented longitudinally and being directed opposite to one another, the reactive force path being defined by a combination of elements lengthwisely interspaced from one another relative to the linear displacement path, the elements including an A type force element associated to a first end of the mass, and a sequence of a B type force element and an A type force element associated to a second end of the mass.

In accordance with a third aspect, there is provided an operating mode of a linear actuator having a broad frequency response spectrum by shifting the resonance frequency including disbalancing the energy input in one side or the other. Indeed, in this manner, a single linear actuator can be operated at significant amplitudes at significantly different frequencies.

Accordingly, in accordance with this third aspect, there is provided: a method of operating a linear actuator having a mass movably mounted in a linear displacement path, a drive force generator configured to selectively impart acceleration to the mass in the orientation of the linear displacement path, and a reactive force path generating a return force on the mass in the orientation of the linear displacement path, the amplitude of the return force varying as a function of the position of the mass in the linear displacement path, the method comprising oscillating the mass within the linear displacement path at a first frequency and a first acceleration amplitude including operating the drive force generator at a maximal force, the first acceleration amplitude corresponding to a maximum acceleration amplitude; and then oscillating the mass within the linear displacement path at a second frequency and a second acceleration amplitude, second frequency being separated from the first frequency by at least one fifth, preferably one fourth, of a frequency value of the first frequency, the second acceleration amplitude having at least 40%, preferably at least 50% of the first acceleration amplitude.

In accordance with another aspect there is provided a linear actuator having a mass movably mounted in a linear displacement path, a drive force generator configured to selectively impart acceleration to the mass in the orientation of the linear displacement path, and a reactive force path generating a return force on the mass in the orientation of the linear displacement path, the amplitude of the return force varying as a function of the position of the mass in the linear displacement path, the amplitude of the return force further varying as a function of an oscillation frequency of the mass, in accordance with a frequency response curve, the frequency response curve having a first frequency response peak associated to a maximal frequency response of oscillation of the mass at a natural frequency of the reactive force path, and a second frequency response peak separated from the first frequency response peak by at least one fifth, preferably one fourth, of the frequency value of the first frequency response peak, and having an amplitude of at least 40%, preferably at least 50% of the amplitude of the first frequency response peak.

In accordance with another aspect, there is provided a linear actuator comprising a mass movably mounted in a linear displacement path, the mass having a magnetic segment, a drive force generator configured to selectively impart acceleration to the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the reactive force path including a permanent magnet force element disposed transversally adjacent to the linear displacement path and magnetically coupled with the magnetic segment.

In accordance with another aspect, there is provided a linear actuator comprising a mass movably mounted in a linear displacement path, a drive force generator configured to selectively impart a drive force to the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the force response curve having regions of increasing return force associated to opposite ends of the linear displacement path, and a plateau region located between the regions of increasing return force.

In accordance with another aspect, there is provided a method of operating a linear actuator comprising a mass movably mounted in a linear displacement path, the method comprising imparting a drive force to the mass in the orientation of the linear displacement path, thereby accelerating the mass along the linear path, a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the force response curve having regions of increasing return force associated to opposite ends of the linear displacement path, and a plateau region located between the regions of increasing return force.

In accordance with another aspect, there is provided a linear actuator comprising a mass movably mounted in a linear displacement path, a drive force generator configured to selectively impart acceleration to the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the reactive force path being formed of the combination of at least two force elements including an A type force element and a B type force element.

In accordance with another aspect, there is provided a method of operating a linear actuator comprising a mass movably mounted in a linear displacement path, the method comprising imparting a drive force to the mass in the orientation of the linear displacement path, thereby accelerating the mass along the linear path, a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the reactive force path being formed of a combination of force elements including a first A type force element and a second A type force element oriented oppositely to the first A type force element, wherein said imparting a drive force is performed in a repetitive manner at a drive frequency and at a drive amplitude, wherein said mass, in reaction to the drive force and to the reactive force path, is brought to oscillate at a first frequency and at a first acceleration amplitude between the opposite ends of the linear displacement path.

In accordance with another aspect, there is provided a linear actuator comprising a mass movably mounted in a linear displacement path, a drive force generator configured to selectively impart a drive force to the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve which is asymmetric relative to the rest position, the force response curve bringing the mass to a dynamic equilibrium oscillation between the opposite ends of the linear displacement path, at a acceleration amplitude, when the drive force generator imparts the drive force in a repetitive manner, in alternating directions, at a drive frequency and at a drive amplitude, wherein the acceleration amplitude varying as a function of the drive frequency, for a constant drive amplitude, in accordance with a frequency response curve.

In accordance with another aspect, there is provided a method of operating a linear actuator comprising a mass movably mounted in a linear displacement path, the method comprising imparting a drive force to the mass in the orientation of the linear displacement path, thereby accelerating the mass along the linear path, a reactive force path generating a return force when the mass is displaced from a rest position, the return force being in the orientation of the linear displacement path and towards the rest position, the amplitude of the return force varying as a function of the position of the mass in the linear displacement path in accordance with a force response curve which is asymmetric relative to the rest position, said imparting including imparting the drive force in a repetitive manner, in alternating directions, at a drive frequency and at a drive amplitude, thereby bringing the mass to a dynamic equilibrium oscillation between the opposite ends of the linear displacement path, wherein the acceleration amplitude depends on the drive frequency, for a given drive amplitude, in accordance with a frequency response curve.

Many further features and combinations thereof concerning the present improvements will appear to those skilled in the art following a reading of the instant disclosure.

DESCRIPTION OF THE FIGURES

In the figures,

FIG. 1A is a schematic, simplified view of a example linear actuator, FIG. 1B presents the force response curve thereof, and FIG. 1C presents the frequency response curve thereof;

FIG. 2A is a schematic, simplified view of an example of a force element which will be referred to herein as being of A type, FIG. 2B presents the force response curve thereof, FIGS. 2C and 2D present other examples of an A type force elements.

FIGS. 3A to 3E are various graphs used to exemplify the driving of a mass at different frequencies by disbalancing the amount of energy provided to the mass;

FIG. 4A is a schematic, simplified view of another example of an A type force element, FIG. 4B presents the force response curve thereof;

FIG. 5A is a schematic, simplified view of an example of a force element which will be referred to herein as being of B type, FIG. 5B presents the force response curve thereof, FIG. 5C presents the frequency response curve thereof, FIGS. 5D to 5F present other examples of B type force elements;

FIG. 6A is a schematic view of another example of a force element, FIG. 6B presents the force response curve thereof, FIGS. 6C and 6D are other examples thereof;

FIGS. 7A and 8A are other examples of force elements, and FIGS. 7B and 8B present the respective force response curves, FIG. 8C is an example mass having two magnetic segments;

FIG. 10A presents another example of a composite reactive force path, FIG. 10B to 10O are force response curves of individual elements thereof, FIG. 10D is the total force response curve for the system, and FIG. 10E is the frequency response curve thererof.

FIGS. 11A and 12A present corresponding variants to the composite reactive force path of FIG. 10A, and FIGS. 11B and 12B present the respective frequency response curve thereof;

FIGS. 13A and 13B present alternate examples of composite reactive force paths;

FIG. 15 is a schematic view of an example computer;

FIG. 16 is a schematic view of an electronic device incorporating a computer and a linear actuator;

FIGS. 17A to 17D are schematic views of different variants of a linear actuator where different mechanisms are used to movably mount the mass in a linear displacement path.

DETAILED DESCRIPTION

Figure 2G:
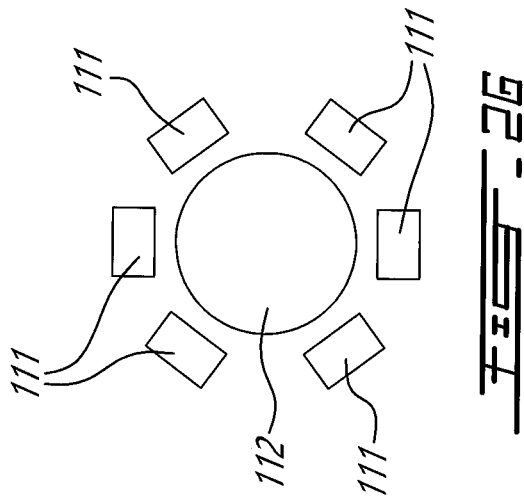
FIGS. 2E to 2G are schematic, simplified cross-sectional views of the different examples of the force element.

FIG. 1A shows a relatively simple example of a linear actuator 22 which can be used for providing haptics feedback. Using this example, some language useful for the description of other linear actuators which will follow will be introduced. The linear actuator 22 can be said to generally include a mass 12 which can be moved linearly back and forth along a linear path 24. The linear path 24 can be defined by a linear guide, such as by being circumscribed by a housing 26 defining a linear path 24 longer than the mass 12 for instance, in which the mass 12 can be slidingly engaged. Other examples ways of defining a linear path will be detailed below in relation with FIGS. 17B to 17D, discussed herebelow.

The linear actuator 22 also includes some form of drive force generator (not shown) which is configured for selectively imparting a drive force, or not, onto the mass 12 to spur its movement along the linear path 24. In the case where the mass 12 has one or more magnetic segment(s), the drive force generator can be an electromagnet which is magnetically coupled to a permanent magnetic field of the mass 12, for instance, but other forms of drive force generator, or ways of driving the movement of the mass, may be preferred in other embodiments.

The linear actuator 22 is further provided with a reactive force path which, in the example presented in FIGS. 1A to 10, is entirely provided by means of a compression spring 14 which is secured between the mass 12 and the housing 26 at one end 28. In this embodiment, the compression spring 14 has a spring constant k which can remain constant along the entire span of displacement along the linear path 24, and therefore generate a linear force response curve 18 (FIG. 1B). The force response curve 18 of the reactive force path 32, represented here by dashed boxes in FIG. 1A, is presented in FIG. 1B. As shown on the left hand side of the rest position 16 of FIG. 1B, the reactive force path 32 generates a progressively (linearly) increasing return force 30. The farther the mass is moved along the linear path from the rest position 16 towards the left, the more the spring 14 is stretched, following a typical mass/spring behaviour, governed by the equation F=kx (where x is displacement). As shown on the right hand side of the rest position 16 of FIG. 1B, the reactive force path 32 offers a progressively increasing return force 30 the farther the mass is moved towards the right from the rest position 16, compressing the spring 14.

In this case, the force response curve 18 is linear, in the sense that it has a constant slope k, and the force response is proportional to the distance from the rest position 16. Since the maximum extent of the linear displacement path 34 and the amplitude of the maximum displacement 34 can vary from one embodiment to another, it may be practical to provide values of slope k in relative units. Indeed, independently of the embodiment, the linear displacement path 24 can have a static rest position 16, also known as an equilibrium position, from which the mass 12 can be moved by the drive force generator in two directions, to corresponding ends 28, 36 of the linear displacement path 24. The ends 28, 36 of the linear displacement path 24 can be defined by the reactive force path, and can even be delimited by hard stops for instance, or can be defined by properties such as the maximum force and frequency of the drive force generator, and friction, which can be translated into a maximum extent of displacement at perfect resonance for instance. The maximum force 38 and the maximum extent/span of displacement 34 are thus properties of a given linear actuator independently of the details of implementation. To define normalized units, let us define units in which half of the full span of the linear displacement path 24 is equal to the maximum return force 38. For example % of the maximum extent of displacement 34 can have a value of 1 in units of maximum displacement, and the maximum return force 38 exerted by the reactive force path can have a value of 1 in units of maximum return force 38. The slope can thus be expressed in units of increasing force per units of increasing displacement. In the context of a linear reactive force path, using the definition presented above, the slope remains constantly equal to 1 in these units along the entire extent of displacement, on either side of the rest position 16. The slope is also 1 at the rest position 16, clearly defining the static rest position 16. The force response curve 18 is also symmetrical, providing an equal return force 30 independently of the mass position orientation relative to the equilibrium position 16.

The shape of the force response curve 18 is thus also a property of the linear actuator, and will be defined by the force element(s) of the reactive force path. In this embodiment, there is a single force element, the compression spring 14, which entirely defines the force response curve 18 but it is understood that other embodiments can be used without departing from the presented disclosure. Examples of other embodiments will be presented below.

The shape of the force response curve 18 will entrain dynamic effects which can be visualized during operation. In this example, for instance, the force response curve 18 includes a first region 40 of increasing return force 30 extending from the rest position 16 to the first end 28 of the linear displacement path 24, on a first side of the rest position 16, and a second region 42 of increasing return force 30 extending from the equilibrium position 16 to the second end 36 of the linear displacement path 24, on a second side of the equilibrium position 16. The two regions 40, 42 of increasing return force 30 define the entirety of the force response curve 18. The return force 30 always acts in the orientation of the displacement, which can be due to the fact that the linear displacement path 24 constrains the movement within that orientation, but acts in opposite directions depending on the side relative to the rest position 16, and thus always acting in a manner to return the mass 12 to the rest position 16, hence the expression "return" force.

If moved to one side against the return bias of the spring 14, and suddenly freed from the external force, the spring 14 will pull the mass 12 back past the rest position 16, an the mass 12 will oscillate back and forth around the rest position 16 for a certain amount of time before its energy is dissipated in friction and the mass 12 settles back at the 'static' rest position 16 (which can be a region instead of a point in a non-linear system, but a point is typically preferred in haptics). The frequency at which the mass 12 will oscillate back and forth is the natural frequency of the linear actuator, and will be denoted $W_0$. $W_0$ depends on the slope of the force response curve 18 which, in this embodiment, is directly related to the spring constant k. If the drive force generator is configured to provide drive energy repetitively into the system 10 at a frequency close to the natural frequency $W_0$, which can be done by operating a coil with alternating current for instance, the repetitively added energy will add up into a "resonance", and the moving mass 12 will reach greater and greater amplitudes of displacement and acceleration until it meets a dynamic equilibrium oscillation, in which the energy losses due to friction will correspond to the amount of energy introduced into the system at each cycle. As the electromagnet (coil) is not the main focus in the present application and for clarity sake, the electromagnet coil is omitted of various of the drawings discussed in the present disclosure. The electromagnet C, more specifically the coil of the electromagnet, is however at least shown in the embodiments of FIGS. 5F, 10A, 10F to 10J, 11A, 12A, 14A and 17A to 17D.

The expression "provide drive energy repetitively into the system at a frequency close to the natural frequency" may be best understood by referring to FIG. 1C. FIG. 1C presents a graph which shows the force (acceleration) response spectrum 20 of the linear actuator 22 of FIG. 1A as a function of drive frequency, for a given drive energy amplitude. Indeed, if the same amount of energy is provided to the mass 12, but at a different frequency than $W_0$, the mass 12 will still be driven but some of the energy will not be efficiently transferred into movement since the movement of the spring 14 will not resonate with the drive and as such, the amplitude of acceleration and displacement of the mass 12 driven by the drive force will be lesser. Indeed, the peak shown in the frequency response graph corresponds with the frequency $W_0$. One can see that the force response generated will diminish progressively as the drive frequency is shifted farther and farther away from the natural frequency $W_0$.

In a context where the drive force generator has a maximal drive force generator value (maximum amount of drive energy), which, in the case of an electromagnet (coil) drive can correspond to a maximum voltage for instance, the maximal drive force generator will only produce the maximal acceleration response value Gmax if its maximum voltage input is correctly timed to oscillate between positive and negative at the natural frequency $W_0$, and the maximal drive force generator value will generate a smaller acceleration response the farther away it is operated from the natural frequency $W_0$, and in this example a shift of $\frac{1}{5}^{th}$ in frequency from $W_0$ will produce only a negligible acceleration response, perhaps below 5% of the maximum acceleration response value.

Here again, since the frequency response spectrum 20 is defined by the force response curve 18, which in turn in defined by the force element(s) which define the reactive force path, the frequency response spectrum 20 of a linear actuator 22 can be said to be a property of the linear actuator, similarly to how the force response curve 18 can be a property of the linear actuator 22 or the details of the force element(s) are properties of the linear actuator 22.

Haptic actuators can be used in electronic devices such as smartphones and remote-controllers. A haptic actuator manufacturer may specialize in manufacturing haptic actuators, and may sell his haptic actuator to different electronic device manufacturers. The haptic actuator manufacturer may want a single model of haptic actuator, being industrially produced in a manner to reduce production costs, to easily adapt to different situations, such as drive frequencies which may vary from one electronic device manufacturer to another, or even during use of a single electronic device (e.g. where different drive frequencies are intended to generate different vibration frequencies perceivable by the user). One will readily understand that a linear actuator 22 such as presented in FIG. 1A can be ill adapted to meeting such needs given the fact that its acceleration response spectrum 20 is strongly centered around a unique value. There can thus be a desire for a linear actuator which has a broader band frequency response spectrum, or simply for a linear actuator which is better adapted to provide more complex haptics signals, such as vibrations over a certain band of frequencies, to the user. From the user's perspective, this could be perceived as a range of slower or faster vibrations (frequency), as opposed to only stronger or weaker vibrations (amplitude), for instance.

The following description explores a number of alternative force elements, the effect they can have on the force response curve, and, in turn the effect they can have on the frequency response curve. It was found that some force elements, and combinations thereof, were better adapted to providing a satisfactorily broader band frequency response spectrum, for instance.

FIG. 2A presents an example embodiment of a first type of force element 100. FIG. 2B presents its force response curve 118 presented in FIG. 2A. In the example embodiment of FIG. 2A, the force element 100 has a permanent magnetic field 102 coupled with a magnetic field of the mass 104. However, it will be noted that in an alternate embodiment, a comparable force response curve 118 can be implemented with a spring element 114 such as schematized in FIG. 2C. Accordingly, the force response curve 118 can be a more significant property defining a type of a force element than the details of its make or of the nature of its interaction with the mass 112. Let us thus focus on the characterizing features of the force response curve 118 of FIG. 2B, as opposed to the other properties, to define this first type of force element, which will be referred to hereinafter as a "type A" force element.

As shown in FIG. 2B, a type A of force element offers a region of increasing return force 140 on a first side of the rest position 116, and a plateau region 142 of relatively low, non-zero return force on the second side of the rest position 116. Indeed, if the mass 112 is moved to the left of the rest position 116, the mass 112 will perceive a strongly increasing repel force which will act to return the mass 112 towards the rest position 116—that is, the point where the force response line intersects the zero force axis on the graph of FIG. 2B. However, if moved to the right of the rest position 116, the return force will increase slightly, and quickly reach a plateau of relatively constant return force. A point of maximum return force can be associated to an end 136 of the linear displacement path 124 on the left side of the rest position 116. As presented above, the value of maximum return force can be defined by a number of properties of the linear actuator, such as the maximum force of the drive force generator, the frequency of the drive force generator, the amount of friction, and the shape of the force response curve 118 for instance. The maximum return force at the end 136 of the first side—that is, the region of increasing return force 140, can be significantly higher, such as more than twice, more than three times, more than 5 times, and even more than 8 times the levels of force reached in the plateau region 142. The plateau region 142 can span a linear displacement distance at least equal to, or even at least 1.5 times the linear displacement distance spanned by the region of increasing return force 140.

Since the values of the maximum return force and the maximum extent of displacement can vary independently from one another depending on the embodiment and depending on the units used, it can be convenient to define normalized units for the purpose of defining the slope of variation of return force on variation of displacement. In the normalized units, the value of maximum return force can be set to be equal to the value of half the distance span of the linear displacement path 124. For example, maximum return force of the linear actuator can be set to have a value of 1 return force unit, and ½ of the total span of linear displacement path 124 can be set to have a value of 1 displacement unit. Using this definition, the region of increasing return force 140 on the left hand side of the rest position 116 can be seen can be seen to have a slope which remains above 1 for more than ¾ f its span, and even the entirety of its span, whereas the plateau region 142 can have a slope which remains between zero and 1, and even below 0.5, for more than ¾, or even the entirety of its span. Moreover, the return force in the plateau region 142 can remain between 5% and 20% of the maximum return force over more than ¾ of its span. This plateau region 142 is an interesting feature from the point of view of movement dynamics.

The shape of the force response curve 118 defined by such a Type A force element 100 is somewhat reminiscent of an exponential function formed by the equation $y=b^x-1$. Accordingly, a Type A force element can be said to have a response curve 118 shaped as a portion of a curve formed by an exponential function formed by the equation $y=b^x-1$, where the x=0 position corresponds to the rest position 116 of the force response curve 118, where the return force is zero.

Figure 2F:
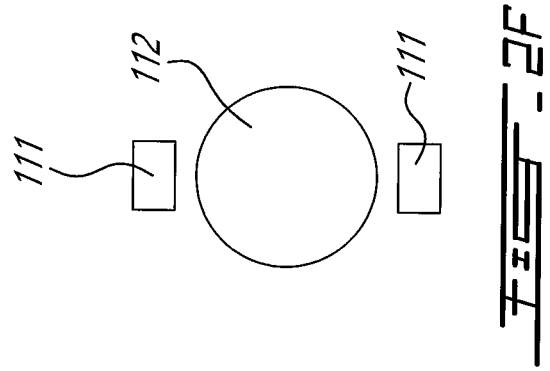
Figure 2E:
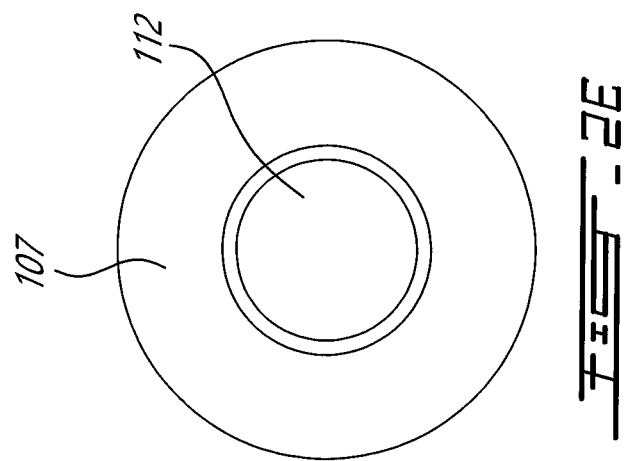

In the specific embodiment illustrated in FIG. 2A, the force element 100 has a permanent magnet force element 106 which is disposed transversally adjacent to the linear displacement path 124. The permanent magnet force element 106 is configured to generate a magnetic field 102 which is parallel to and in the same direction as the magnetic field 104 of one or more magnetic segment of the mass 112 with which it is coupled. In the illustrated embodiment, the permanent magnet force element 106 generates the magnetic field 102 on at least two transversal sides 108 of the mass 112, in a manner to balance out and exert forces which are closely aligned with the orientation of movement. For example, the permanent magnet force element 106 can consist of a single annular magnet 107 surrounding the mass 112, such as schematized in FIG. 2E, or of a plurality of magnets 111 which are distributed symmetrically around the mass 112 so as to balance out, such as shown in FIGS. 2F and 2G. While the embodiment of FIG. 2A uses a permanently magnetized force element 106, an alternate embodiment can use an electromagnet 110, or a combination of permanent and electromagnet, such as presented in the example of FIG. 2D. The magnetized force element 106 is positioned adjacent to the linear displacement path 124 of the mass 112 such that the mass 112 can be moved beside it.

FIG. 2A presents the mass 112, or more specifically a magnetic segment/magnetized portion thereof, at a rest position 116 relative to the force element 100. When at the rest position 116 relative to the type A permanent magnet force element 106, the magnetic segment 114 of the mass 112 can be seen to be longitudinally adjacent with the magnet or magnets forming the magnetic force element 106. More specifically, at the rest position 116, the longitudinal end of the magnetic segment 114 of the mass 112 may be transversally aligned, or very close to transversal alignment with, the opposite longitudinal end 146 of the permanent magnet force element 106. The magnetized segment 114 of the mass is magnetized in the same orientation and direction as the at least one magnet forming the drive force generator. The force response curve 118 is roughly reminiscent of the force response curve of a spring element 114 such as shown in FIG. 2C, and in some embodiments, a spring-type element such as shown in FIG. 2C can be used as an alternative to the magnet-type force element 106 of FIG. 2A. Similarly, the magnet force element 106 of FIG. 2A can be considered an alternative to a spring element 114 such as shown in FIG. 2C, and in some embodiments, the magnet force element 106 can have advantages over the spring element 114 of FIG. 2C. Indeed, for instance, a magnetic force element 106 may be less prone to wear than a spring element 114. Similarly, if the linear actuator 122 is used for haptics, for instance, it can be required to fit within a limited footprint within an electronic device. The footprint can have a length specification which may be difficult to accommodate with a spring element 114 positioned at one end of the displacement path, and can be easier to accommodate with a magnetic force element 106 positioned adjacent the displacement path, for instance.

FIG. 2D presents an alternate embodiment to the embodiment of FIG. 2A, which uses a combination of permanent magnet and electromagnet 110 in the force element 106 instead of solely permanent magnet. When the electromagnet 110 is activated, the force response curve can be the same as, or equivalent to, the force response curve 118 presented in FIG. 2B, for instance, whereas when the electromagnet 110 is de-activated, the force response curve can remain similar in shape, but at a reduced amplitude.

For the purpose of this specification, resilient force response path elements such as presented in FIGS. 2A, 2C and 2D can be considered to be of the "A type".

In the embodiment presented in FIG. 2A, the permanent magnet force element 106 has a permanent magnetic field 102 oriented parallel to the linear displacement path 124, and, at the rest position 116, the permanent magnet force element 106 is positioned linearly adjacent the magnetic segment 144 of the mass 112 and the permanent magnetic field 102 is oriented parallel and in a same direction as a permanent magnetic field of the magnetic segment 144.

It will be noted here that the force response curve 118 of the A-type element is asymmetric, in the sense that it is significantly different depending on the side along which the mass 112 is moved, and has a slope which varies along its length. Here, along its length corresponds the linear displacement path 124, such that the slope varies based the position x along this linear displacement path 124. Since the slope varies along its length, its resonance frequency can be shifted from the natural frequency $W_0$ to a certain extent by disbalancing the amount of drive energy in a manner to artificially move the dynamic center of movement towards one side or the other. This is schematized in FIG. 3A where different resonating frequencies are represented by the slopes $W_0$, $W_1$, $W_2$.

FIG. 3B presents one way to drive the movement of the mass 112 with alternating current in a balanced manner. A square shaped wave 148 is shown as one possible way of maximizing the amount of energy, but other wave shapes can alternately be used. The energy is balanced in the sense that as much energy is provided to drive the mass 112 towards the left, than the amount of energy provided to drive the mass towards the right. This is shown as way of example in FIG. 3B as having, alternatingly, equal voltage amplitude in the positive side of the graph as the voltage amplitude in the negative side of the graph. This can result in reaching the greatest acceleration amplitude by driving the mass 112 at the natural frequency $W_0$ shown in FIG. 3A. FIGS. 3C and 3D present ways of disbalancing the amount of energy to one side or the other. The disbalance is achieved here by adding a DC bias to the signal. In FIG. 3C, the DC bias 152 is positive, which moves the dynamic center of movement 150 to the left, and shifts the peak resonance frequency from $W_0$ to a higher frequency $W_1$. In FIG. 3D, the DC bias 154 is negative, which moves the dynamic center 156 of movement to the right, and shifts the peak resonance frequency from $W_0$ to a lower frequency $W_2$. FIG. 3E is an example of another way of shifting the peak resonance frequency towards $W_2$. In FIG. 3E, instead of adding a DC bias, the waveshape is changed in a manner for the amount of time A where the electromagnet is driven by a positive signal is shorter than the amount of time B where the electromagnet is driven by a negative signal. In both the example of FIG. 3E and the example of FIG. 3D, there is an engineered disbalance between the amount of energy transferred to the mass 112 in one orientation relative to the other.

It will be understood that even though an A type element presents a plateau region 142 which extends over a given length of the linear displacement path 124, and that the amount of acceleration (more precisely deceleration in this case) caused by the element corresponds to the integral of the force response curve 118 over said length, the use of an A type element in and by itself may be limited given that it lacks a more pronounced "dip" (referred to as an increase herein) in the return force on the right hand side of the rest position 116, and may only be suitable for relatively small displacements, which may not make it ideal for an embodiment where strong acceleration response is required. Indeed, in an embodiment such as presented in FIG. 3A, the mass may tend to exceed the intended maximum amount of displacement on the right hand side of the rest position 116.

FIG. 4A presents another example of an A type force element 100. In this example, the force element 100 is formed of permanent magnets and can thus be referred to as a permanent magnet force element 106. The permanent magnet force element 106 is comprised of two sub-elements: a magnet element 158 generating field lines oriented parallel 159 to, in the same orientation than, and offset from the magnetic field of the mass 104 (which can be referred to as a magnet segment 144 oriented parallel, offset, and in the same orientation than the mass 112 for short), such as the first A type presented above. The magnetic element 158 is followed immediately by a subsequent magnet element 160 generating field lines oriented normal 162 to, offset from, and oriented towards the linear displacement path 124. The magnet element 160 oriented normal, or otherwise said transversally inward, to the linear displacement path 124 is positioned between the first magnet element 158 and the rest position 116. This configuration can be referred to as a Half-Halbach array and looking at the force response curve 164 presented in FIG. 4B, the presence of the magnet element 160 oriented normal to the linear displacement path 124 can be seen to increase the slope of the force response curve 164 to the left of the rest position 116. Increasing the slope of the force response curve 164 to the left of the rest position 116 can be desired in some embodiments. It will be noted here that although reference is made to "left side" and "right side" for the sake of simplicity, these references are only used to refer to the way the design is presented in the drawings, and it will be understood that the left side and right side of the drawings can be reversed if looking at the device from the opposite orientation. It will be noted that the slope of the force response curve 164 on the left hand side of the rest position 116 can be more pronounced in the context where the transversally inward oriented magnetic element 160 is added as shown in FIGS. 4A and 4B, compared to the embodiment shown in FIGS. 2A and 2B, leading to a higher natural frequency $W_0$.

FIG. 5A presents yet another example of a force element 200. FIG. 5B presents its force response curve 218. In the example embodiment of FIG. 5A, the force element 200 has a permanent magnetic field 202 coupled with a magnetic field of the mass 204. However, it will be noted that in an alternate embodiment, a comparable force response curve 218 can be implemented with a spring element such as the example spring elements 214 schematized in FIG. 5D. One defining feature of the force elements 200 of FIGS. 5A and 5D is their property of exerting an increasing slope of force as the displacement increases, in a non-linear, exponential, manner. The force response curve 218 can be a more significant property defining a type of a force element 200 than the details of its make or of the nature of its interaction with the mass 212. Here, the force response curve 218 is somewhat reminiscent of the central portion (i.e. a portion centered around x=0) of a cubic polynomial function of the type $y=-(x^3)$, where the x=0 value corresponds to the rest position. This second type of force element 200 will be referred to hereinafter as a "B type" force element.

More specifically, points of maximum return force can be associated to a corresponding, opposite ends 228, 236 of the linear displacement path 224. The force response curve 218 is symmetrical and the return force values of the points of maximum return force 230 can be equal in magnitude and opposite in direction. As presented above, the value of maximum return force can be defined by a number of properties of the linear actuator, such as the maximum force or current operating force of the drive force generator, the frequency of the drive force generator, the amount of friction, and the shape of the force response curve 218 for instance. The force element can offer a region of increasing return force on a first side 240 of the rest position 216, a symmetrical region of increasing return force on the second side 241 of the rest position 216 and a plateau region 242 therebetween.

The plateau region 242 can span a linear displacement distance of at least half, or even equivalent to, the linear displacement distance spanned by the regions 240, 241 of increasing return force. The slope can be defined as defined above, in units where maximum return force of the linear actuator is equal to a value of 1 and ½ of the total span of linear displacement path is equal to a value of 1. Using this definition, the region 241 of increasing return force on the left hand side of the rest position 216 can be seen to have a slope which remains above 1 for more than ¾ of its span, and here, even its entire span, whereas the plateau region 242 can have a slope which remains between zero and 1 for more than ¾ of its span, and here, even its entire span. Moreover, the return force in the plateau region 242 can remain below 10% of the maximum return force over more than ¾ of its span, here, its entire span. In this embodiment, the slope of the force response curve is somewhat low at the rest position 216 since the plateau region 242 crosses the rest position 216. This plateau region 242 can be an interesting feature from the point of view of movement dynamics.

In the specific embodiment presented in FIG. 5A, as with the force elements of FIG. 4A and FIG. 2A, the force element 200 is embodied with a permanent magnetic field 202 configured to interact with a magnetic field of the mass 204 in contributing to define a reactive force path. The force element 200 has at least one magnet 111, which can be a permanent magnet, an electromagnet, or a combination of permanent and electromagnet, which has a magnetic field 202 generally anti-parallel (parallel but oppositely directed) to the magnetic field of the mass 204, and transversally offset from the magnetic field of the mass 204. More specifically, it can be positioned adjacent to the linear displacement path 224 of the mass 212 such that the mass 212 can be moved besides the magnet 111. In one embodiment, a combination magnets 111 can be used on opposite sides of the linear displacement path 212, or on corresponding opposite lateral sides of the mass 212, circumferentially interspaced from one another or circumscribing around the linear displacement path 224, such as was previously schematized in FIGS. 2E-2G in relation to the embodiment shown in FIG. 2A, so as to balance out and produce a resulting force which is better aligned with the linear displacement path 224, for instance, to avoid forcing the mass 212 in a transversal orientation.

FIG. 5A presents the mass 212, or more specifically a magnetized segment 244 thereof, at an equilibrium position relative to the force element 200. It will be noted that such a B Type magnet force element can be transversally aligned with the magnetized segment 244 of the mass 212 at the rest position 216. In other words, while the A type magnet force element 106 was longitudinally adjacent to, or offset from, the magnetic segment 144 of the mass 112 to which it is magnetically coupled, and therefore not transversally aligned when in the rest position 116, the longitudinal position of the B type magnetic force element 206 corresponds to, e.g. overlaps with at least a portion of, the magnetic segment 244 of the mass 212 to which it is magnetically coupled when in the rest position 216. The magnetic force element 206 and the magnetic segment 244 can thus be said to be transversally aligned in the rest position 216. As shown in the force response curve 218 presented in FIG. 5B, if moved to the left of the rest position 216, into a position adjacent to the magnetic force element 206, the mass 212 will perceive a first weak, slowly increasing repel force, and then a stronger, increasingly rapid repel force which will act to return the mass 212 towards the rest position 216. In this case, the force response curve 218 is symmetrical, and the force response is the same in both directions of the linear displacement path 224. The force response curve 218 is roughly reminiscent of the force response curve caused by progressively varying force spring elements 214 such as shown in FIG. 5D, which exhibit a spring constant k that increases over displacement from the rest position 216, and in some embodiments, a spring element 214 such as shown in FIG. 5D can satisfactorily be used as an alternative to the magnet force element 206 of FIG. 5A. Similarly, the magnet force element 206 of FIG. 5A can be considered an alternative to a spring element 214 such as shown in FIG. 5D, and in some embodiments, the magnet force element 206 can have advantages over the spring elements 214 of FIG. 5D. Indeed, for instance, a magnet force element 206 may be less prone to wear than a spring element 214. Similarly, if the linear actuator is used for haptics, for instance, it can be required to fit within a limited footprint within an electronic device. The footprint can have a length specification which may be difficult to accommodate with a spring positioned at one end of the displacement path, and can be easier to accommodate with a magnet positioned adjacent the displacement path, for instance.

FIG. 5E presents an alternate embodiment to the embodiment of FIG. 5A, which uses a combination of permanent magnet and electromagnet 210 in the magnetic force element 206 instead of solely permanent magnet. When the electromagnet 210 is activated, the force response curve can be the same as, or equivalent to, the force response curve 218 presented in FIG. 5B, for instance.

For the purpose of this specification, force elements such as presented in FIGS. 5A, 5D and 5E can be referred to as "B type".

FIG. 5F presents yet another example embodiment where a B type force element is composed of distinct B type sub-elements which cooperate in generating the B type force response curve. Indeed, a B-type spring element 214 is combined with a B-type permanent magnet element 111 and where the individual B-type force response curves of both elements are combined in the resulting, composite B-type force response curve which can be the same as, or equivalent to, the force response curve 218 presented in FIG. 5B, for instance.

A linear actuator having a force response curve of the B type, i.e. such as illustrated in FIG. 5B, can have frequency response spectrum 220 such as presented in FIG. 5C. Such a frequency response curve 220 can have a number of distinctive features. Firstly, it can have a broader band response spectrum that the frequency response of a linear actuator having a linear force response curve such as presented in FIGS. 1B and 1C, for instance. In a broader band response, for a given driving force amplitude, the acceleration (Force in G) amplitude of the mass 212 will be reduced less for a given difference of frequency with the peak frequency 266 than in a narrower band response spectrum. Moreover, there can be more than one acceleration amplitude peak, or "bump" in the frequency response spectrum 220, as opposed to a single acceleration amplitude peak at a single frequency. It is understood that the frequency and acceleration amplitude peaks are to be taken when the mass is driven to a dynamic equilibrium oscillation between the opposite ends of the linear displacement path of the linear actuator. Finally, there can be linear effects such as a foldover effect 268 in the shape of the resonance curve of the frequency response spectrum. In a foldover effect 268, there can be more than one resonance energy, or dynamic equilibrium oscillation states at a given frequency for a same driving force amplitude and frequency, such as frequency V identified in FIG. 5C.

There are various ways by which one can harness a foldover effect 268 stemming from non-linearity present in the frequency response spectrum 220 of a linear actuator, these can involve actively choosing which resonance energy is used for a given drive force amplitude and frequency. For instance, in one embodiment, one may prefer providing a flatter, more neutral response, by selecting the lower power state, or providing a higher G-force output by selecting the higher power state. The selection can be made in two different ways. In a first example, imparting a first driving force amplitude at a first frequency may lead to exciting a first, lower power state. If the first, lower power state is desired, the driving force amplitude and frequency can then remain constant. Two different example methods which can allow to reach a second, higher power state, if desired, will now be presented. Firstly, the driving force can be excited at the same first frequency V, but at a higher driving force amplitude. This can excite the higher power state. Then, once the higher power state is reached, the driving force amplitude can be reduced back down to the first driving force amplitude, which may be sufficient to sustain the higher power state while not being sufficient to excite it. Secondly, the driving force can be excited at a second frequency which is different from the first frequency, and at a position along the frequency response spectrum 220 where no foldover effect 268 is present, but at a position which is adjacent to the foldover region and which leads to it. In this embodiment, the foldover region extends to the right, and therefore the second frequency can be at the left of the foldover region. For instance, in FIG. 5C, the frequency W is different from the frequency V and at a position along the frequency response spectrum 220 where no foldover effect 268 is present, but is still adjacent to the region containing the foldover effect 268. Since no foldover is present at the frequency W, the single, high power state is excited.

Then, the frequency is progressively varied from W towards the foldover region, which may lead to sustaining the higher power state in the foldover region, such as at frequency V. Notwithstanding the fact that this higher power state would not have been excited if the frequency had not "folded over".

FIG. 6A presents another example of a force element 300. In this example, the force element 300 is comprised of two sub-elements: a magnet element 311 oriented normal to, directed transversally inward, and offset from the magnetic field of the mass provided as part of the force elements outside the linear displacement path 324, and corresponding magnet elements 358 integrated within the mass 312. The corresponding magnet elements 358 integrated within the mass 312 are also oriented normal to, and directed transversally inward relative to the linear displacement path 324, are oriented in the same orientation as the magnet elements 311 which are outside the linear displacement path 324, and are located adjacent the longitudinally magnetized segment 344 of the mass. This configuration can produce a force response curve 318 such as presented in FIG. 6B. The force response curve 318 is roughly reminiscent of the force response curve caused by dual, opposed spring elements 314 such as shown in FIG. 6C, and in some embodiments, a spring element 314 such as shown in FIG. 6C can be used as an alternative to the magnet force element 306 of FIG. 6A. Similarly, the magnet force element 306 of FIG. 6A can be considered an alternative to a spring element 314 such as shown in FIG. 6C, and in some embodiments, the magnet force element 306 can have advantages over the spring element 314 of FIG. 6C. Indeed, for instance, a magnet force element 306 may be less prone to wear than a spring element 314. Similarly, if the linear actuator is used for haptics, for instance, it can be required to fit within a limited footprint within an electronic device. The footprint can have a length specification which may be difficult to accommodate with a spring positioned at one end of the displacement path, and can be easier to accommodate with a magnet positioned adjacent the displacement path, for instance. This force response curve 318 does not exhibit a plateau region, and offers a slope greater than 1 across the rest position, following the same unitary definition provided in previous embodiment.

FIG. 6D presents an alternate embodiment to the embodiment of FIG. 6A, which uses a combination of permanent magnet and electromagnet 310 in the magnet force element 306 instead of solely permanent magnet. When the electromagnet 310 is activated, the force response curve can be the same as, or equivalent to, the force response curve 318 presented in FIG. 6B, for instance.

For the purpose of this specification, force elements such as presented in FIGS. 6A, 6C and 6D can be referred to as being of the "C type" or of generating a C type force response curve. The C-type force response curve is somewhat reminiscent of the curve formed by the function $y=-(\sqrt{x})$.

FIG. 7A presents another example of a force element 400 which incorporates some elements of a configuration such as presented in FIG. 4A, but adds another magnet element 458 after the magnet element 160 oriented normal to the linear displacement path 424. The other magnet element 458 is oriented anti-parallel to the magnetic field of the mass 412 and anti-parallel to the magnetic field of the first magnet element 158. This configuration can produce a force response curve 418 such as presented in FIG. 7B, which can be roughly reminiscent of the force response curve 18 presented in FIG. 1B. In some embodiments, a spring element such as shown in FIG. 1A can be used as an alternative to the magnet force element 406 of FIG. 7A. Similarly, the magnet force element 406 of FIG. 7A can be considered an alternative to a spring element such as shown in FIG. 1A, and in some embodiments, the magnet force element 406 can have advantages over the spring element of FIG. 1A. Indeed, for instance, a magnet force element 406 may be less prone to wear than a spring. Similarly, if the linear actuator is used for haptics, for instance, it can be required to fit within a limited footprint within an electronic device. The footprint can have a length specification which may be difficult to accommodate with a spring positioned at one end of the linear displacement path, and can be easier to accommodate with a magnet positioned adjacent the linear displacement path, for instance.

FIG. 8A presents another example of a force element 500. FIG. 8A is similar to FIG. 7A but additionally integrates obliquely oriented magnet elements 558 adjacent to a magnet segment 544 in the moving mass 512. The obliquely oriented magnet elements 558 have an effect on the magnetic field lines and produce a curve in the right side portion 560 relative to the rest position 516 of the force response curve 518 such as presented in FIG. 8B.

Different ones of the force elements introduced above can be combined at different longitudinal positions along the linear displacement path so as to produce additional, varying effects on the mass and allow to tailor the force response curve in accordance with the needs of a specific embodiment. Similarly, the mass can have more than one magnetized segment, and if more than one magnetized segments are present, they can be magnetized in different orientations.

Indeed, referring to FIG. 8C for instance, an example of a mass 612 having two magnetic segments 644a, 644b which are oriented antiparallel to one another and lengthwisely separated from one another by a spacer 660 of ferromagnetic material, such as a soft ferromagnetic material. As illustrated in FIG. 8C, the presence of the magnetic field 662*b* of the second magnetic segment 644*b* can compress the magnetic field 662*a* lines of the first magnetic segment 644*a* and increase their curvature, which the ferromagnetic material spacer 660 further facilitates, and which can in turn lead to a stronger concentration of magnetic field strength and a greater coupling with other magnetic elements. For instance, if the drive force generator is an electromagnet surrounding the mass 612 when the mass 612 is at its rest position, and where the electromagnet is transversally aligned in a manner to longitudinally overlap the spacer 660 of ferromagnetic material, the drive force generator can be significantly more efficient at imparting acceleration to the mass 612 for a given amount of energy than if the drive force generator is otherwise aligned with the mass 612 or than if the second magnetic segment 644*b* is not present. Moreover, the more tightly wrapped magnetic field lines can interact more efficiently with force elements disposed transversally adjacent to either one, or both, of the magnetic segments 644*a*, 644*b*.

Figure 9D:
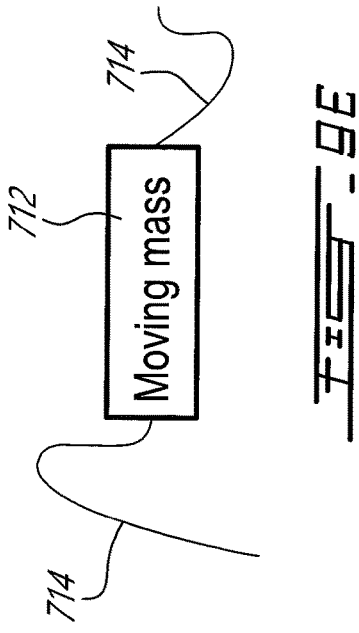
FIG. 9D is the total force response curve for the system.
Figure 9E:
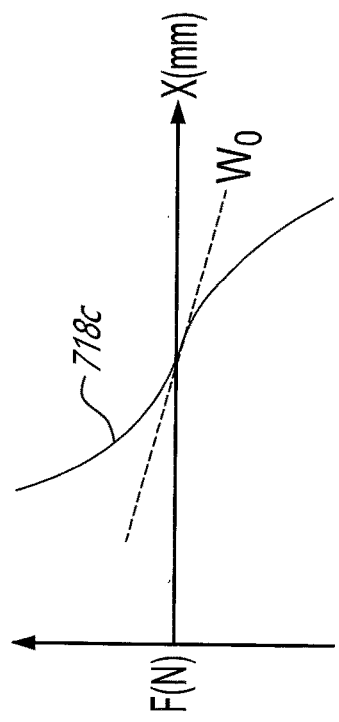
FIG. 9E is another example thereof.
Figure 9A:
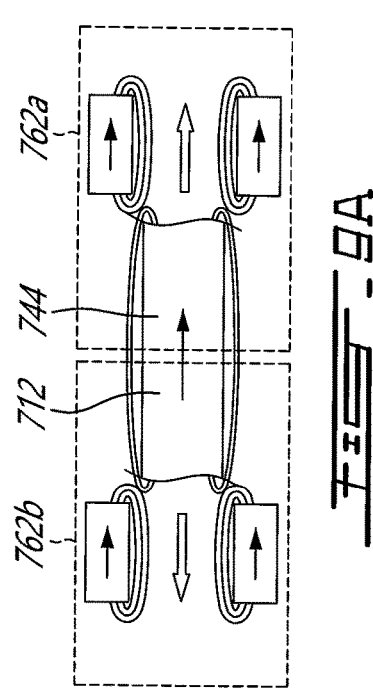
FIG. 9A presents an example of a composite reactive force path.
Figure 9B:
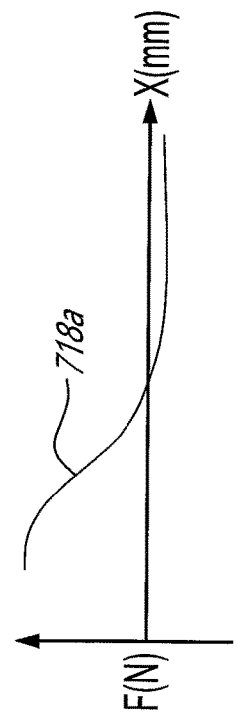
FIGS. 9B and 9C are force response curves of individual elements thereof.
Figure 9C:
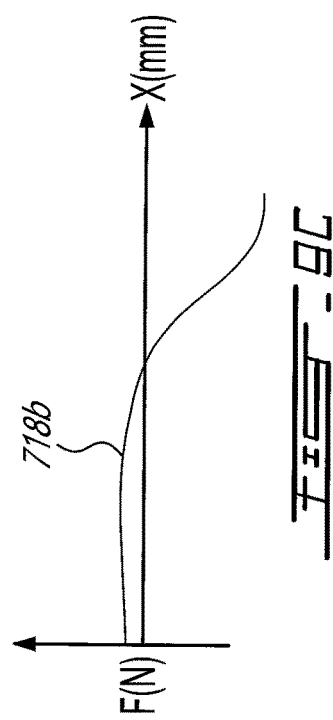

A first example of a composite reactive force path composed of a combination of individual elements is presented in FIG. 9A. In this example, two A type elements 762*a*, 762*b* of opposite orientations are used, one on each side of a magnetized portion 744 of the mass 712. The force response curve 718*a* caused specifically by the first element 762*a* is presented in FIG. 9B, and the force response curve 718*b* caused specifically by the second element 762*b* is presented in FIG. 9C. The force response curve 718*b* of the second element 762*b* can be seen to be the inverse of the force response curve 718*a* of the first element 762*a* since the orientations are opposite. The effects are added to one another to produce the resulting, compound force response curve 718*c* presented in FIG. 9D. It will be noted that although A type elements are used, the general shape of the resulting force response curve 718*c* is somewhat similar to the force response curve 218 presented in FIG. 5B and associated to B type elements, and can thus be considered a B type force response curve. The combination of force path elements of one or more types can be an alternate way of achieving a desired frequency response spectrum, and can be advantageous at least in some embodiments. The example embodiment presented in FIG. 9E can offer a force response curve similar to the one achieved with the example presented in FIG. 9A, but can achieve this using two oppositely oriented A type spring elements 714 instead of two oppositely oriented A type magnet force elements 762*a*, 762*b*.

A second example of a composite reactive force path is presented in FIG. 10A. FIG. 10D presents the resulting composite force response curve 818. In particular, it will be noted that the composite reactive force path in the example of FIG. 10A includes a combination of an A type force element 862*a*, the individual force response curve 818*a* of which is represented in FIG. 10O, and of a B type force element 862*b*, the individual force response curve 818*b* of which is represented in FIG. 10B. In the example embodiment of FIG. 10A, the force elements have permanent magnetic fields coupled with a permanent magnetic field of the mass 812. However, it will be noted that in alternate embodiments, a comparable composite force response curve 818 to the one presented in FIG. 10D can be achieved with a combination of spring elements such as the ones presented in FIGS. 2C and 5D for instance. Here again, the resulting force response curve 818 can be a more significant property defining the linear actuator than the details of the elements used to form the composite force response curve 818, and the focus can thus be turned to the defining features of the composite force response curve 818. Turning first to the strengths and weaknesses of the force response curves 818*a*, 818*b* of the individual force elements 862*a*, 862*b* forming the reactive force path.

Indeed, it will be recalled that the B type force element 862*b* could present the advantage of having a region of increasing return force on a first side of the rest position 816*b*, a region of increasing return force on the second side of the rest position 816*b*, and a plateau region therebetween (see FIG. 5B for details). The presence of the two opposite regions of increasing return force can be advantageous in some haptics linear actuator embodiments due to the fact that these can allow to effectively trap the mass therebetween. However, the low slope at the intersection between the force response curve 818*b* and the rest position 816*b*, which is the point of zero force in this force response curve 818*b*, may not be desirable as it may lead to a mass which is more loosely held at its rest position 816*b* when the linear actuator is inactive than in an embodiment where the slope would be higher.

Moreover, it will be recalled that the A type force element 862*a* could present the advantage of having a more pronounced slope at the rest position 816*a*, in a context where the plateau region it offers has a more stable slope and is offset from the zero force line. However, the A type force element 862*a* only has one region of increasing return force and the lower forces which are exerted on the other side may not satisfactorily trap the mass within the intended linear displacement path.

In the composite force response curve 818 presented in FIG. 10D, it can be seen that by combining an A type force response curve 818*a* with a B type force response curve 818*b*, the advantages of both force response curves 818*a*, 818*b* can add up in a manner to eliminate or alleviate the individual disadvantages. Indeed, the composite force response curve 818 can have two regions of increasing return force 864, 866, each leading to a corresponding end 828, 836 of the linear displacement path 824 associated with a corresponding point of maximum return force, with a plateau region 842 between the regions of increasing return force 864, 866. Moreover, the slope across the rest position 816 can be higher than it would be in a B type force response curve, such as the force response curve 818*b* shown in FIG. 10B for instance. The longitudinal extent of the plateau region 842 can be greater than the longitudinal extent of the plateau region in a B type force response curve. The plateau region 842 can have most, if not all of its extent being at very low slope and at a non-zero force. The shape of the composite force response curve 818 can be advantageous in haptics, and even be used, in combination with a disbalancing of the energy, to generate different potential responses. Indeed, by disbalancing the force generation towards the left of the resting point 816, one can generate a strong high frequency response region, by disbalancing towards the right from the resting point 816, one can generate a strong lower frequency response region, and by harnessing the long plateau region and the high slope of the region of increasing return force on the right hand side of the plateau region 842 with a stronger disbalance towards the right, one can operate the actuator in an "impact" mode where the strong slope is used to produce significant deceleration and then acceleration of the mass 812 in the opposite orientation.

Indeed, looking more specifically into the example composite force response curve 818 presented in FIG. 10D, it can be seen that the maximum return force at both ends 828, 836 can be significantly higher, such as more than twice, more than three times, more than 5 times, and even more than 8 times the levels of force reached within the plateau region 842. The plateau region 842 can span a linear displacement distance at least equal to, or even at least 1.5 times, or more, of the linear displacement distance spanned by either one, and indeed here both, regions of increasing return force 864, 866. The slope can be defined as defined above, in units where maximum return force of the linear actuator being given a value of 1 and ½ of the total span of linear displacement path being given a value of 1. Using this definition, the region of increasing return force 866 on the left of the rest position 816 or the region of increasing return force 864 on right of the rest position 816 can be seen to have a slope which remains above 1 for more than ¾ of its span, and even the entirety of its span, whereas the plateau region 842 can have a slope which remains between zero and 1, and even below 0.5, for more than¾, or even the entirety of its span. Moreover, the return force in the plateau region 842 can remain between 5% and 20% of the maximum return force over more than ¾ of its span. This plateau region 842 is an interesting feature from the point of view of movement dynamics In the specific embodiment presented in FIG. 10A, the mass 812 has two oppositely oriented magnetized portions 844a, 844b separated by a soft ferromagnetic spacer 860. The soft ferromagnetic spacer 860 can be sized in a manner to compress the magnetic field lines in the central region and increase their degree of curvature such as was previously discussed in relation to the embodiment shown in FIG. 8C. This can, in some embodiments, amplify the coupling with the B type B, and/or the A type elements 862a, 862b (in embodiments where one or both of these elements are embodied as magnets). In some embodiments, such as the one illustrated in FIG. 10A, and since magnetic field strengths typically decrease to the fourth exponential of distance, the B type and A type elements 862a, 862b may only significantly interact with one of the magnetic segments 844a, 844b of the mass 812. However, in other embodiments, A type or B type elements may significantly interact with more than one magnetic segment of the mass. To illustrate the complexity of effects which force elements can have on force response curves, one can consider an embodiment where a B type force element positioned similarly to the B type force element 862b presented in FIG. 10A would further interact with the other magnetic segment 844b. At the rest position of the second magnetized portion 844a relative to the B type element the effect of the B type resilient path element on the first magnetized portion 844a is non-substantial. However, if the mass 812 is moved towards the right in relation to the A type element 862a and the B type element 862b to a certain extent, the B type resilient path element begins to have not only a B type response on the second magnetized portion 844b, but also a A type response on the first magnetized portion 844a. Such an example, can provide a very suitable, broadband frequency response well adapted to some embodiments, such as some haptic actuator embodiments for instance.

Indeed, the specific example presented in FIG. 10A uses two opposite magnetized portions 844a, 844b at opposite ends of the mass 812. AB type element 862b is associated to the rest position of the first magnetized portion 844a of the mass 812, inducing a force response curve 818b presented in FIG. 10B. Moreover, an A type element 862a is provided slightly recessed from the first magnetized portion 844a, thus being positioned in such a manner to have the first magnetized portion 844a of the mass 812 in the rest position, and inducing a force response curve 818a presented in FIG. 100. The resulting force response curve 818 is presented in FIG. 10D and includes a high frequency response region on the left of the rest position 816 corresponding to a region of increasing return force 866, a low frequency response region, higher power efficiency region, corresponding to the plateau region 842, and an impact or magnetic return region corresponding to a region of increasing return force 864, shown as a dip at the right of the plateau region 842. The resilient, but nonetheless strong dip at the right of the plateau region 842 can make the force response curve 818 better adapted in some embodiments than the force response curve of A type elements, such as is shown in FIG. 2B for instance, by providing a more robust "end" to the linear displacement path on the right of the plateau region 842.

Figure 10H:
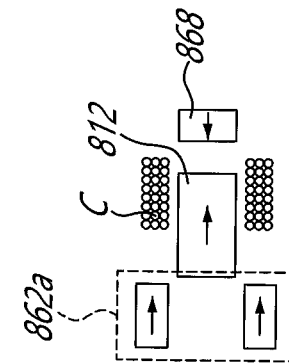
FIGS. 10F to 10K are other examples thereof.
Figure 10G:
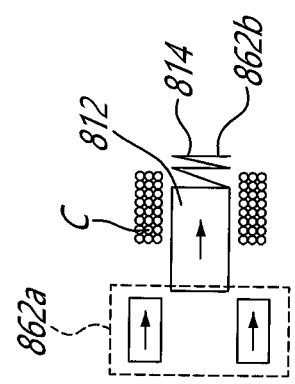
Figure 10F:
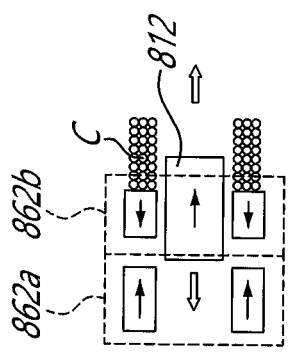
Figure 10K:
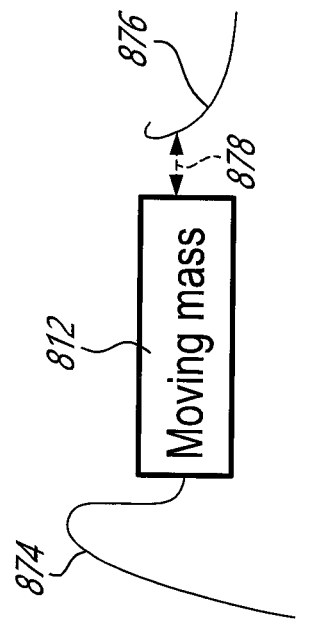

One example alternative to the embodiment presented in FIG. 10A is presented in FIG. 10F. In the embodiment presented in FIG. 10F, the mass 812 has a single magnetic segment but the combination of an A type and a A type magnetic force elements 862a, 862b remains and continues to offer a force response curve generally similar to the force response curve 818 presented in FIG. 10D. The embodiment presented in FIG. 10G is similar to the embodiment presented in FIG. 10F, but the B type force element 862b is provided in the form of a spring element 814 such as was previously presented in FIG. 5D.

Figure 10J:
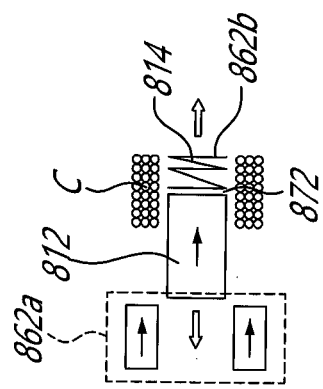
Figure 10I:
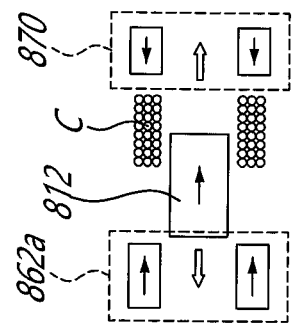

There are other ways of imparting a "dip" at the end of a plateau region in a force response curve resulting from an A type force element 862a. Adding a second region of increasing return force to the first region of increasing return force and plateau offered by the A type force element is one of those ways. For instance, in the embodiment presented in FIG. 10H, a second region of increasing return force can be added by adding a repulsive magnet 868 at the second end of the linear displacement path, opposite the position of the A type force element 862a, which can offer a hard stop to the mass 812 depending on the size of the spacing between the two. FIG. 10I is an embodiment similar to the embodiment of FIG. 10H, but where the repulsive magnet 868 at the second end of the linear displacement path is replaced with a magnet force element 870 which is transversally adjacent to the linear displacement path but still magnetically coupled with the magnetic segment. The embodiment presented in FIG. 10J is similar to the embodiment presented in FIG. 10G, but instead of being in continuous contact with the mass 812, a spacing 872 is provided between the mass 812 and the B type spring element 814. Such a spacing 872 can be a way of taking greater advantage of the potential plateau region span offered by the A type force element 862a. The embodiment presented in FIG. 10K can offer a force response curve comparable to the force response curve of the embodiment presented in FIG. 10J or FIG. 10I for instance, but using only spring elements 814, and more specifically an A type spring element 874 at one end, a B type spring element 876 at the other end of the linear displacement path, and a spacing 878 provided between the B type spring element 876 and the mass 812 when the mass 812 is at the rest position defined here by the A type spring element 874. In this latter embodiment, the A type spring element 874 can remain continuously attached to the mass 812.

It will be noted that the frequency response curve 820, presented in FIG. 10E, includes, in fact, two acceleration amplitude peaks 880, 882 spaced from one another by a frequency difference of more than 100 Hz in this case. The two acceleration amplitude peaks 880, 882 are separated from one another by a significant plateau region 884 which maintains the force provided within said plateau region above 50% of the maximum force (in G) response, provided at the frequency of the highest peak 882. Such a broadband frequency response curve 820 can be very interesting in a variety of applications. Particularly in applications where an exact frequency is not provided, or cannot otherwise be provided, for a variety of reasons, and the forces provided within the plateau 884 are sufficient for the given application, for instance.

Moreover, as shown in FIG. 10E, the frequency response curve 820 can further include a foldover effect 884 which can be harnessed in a manner similar to the explanation provided above in relation with FIG. 5C.

Moreover, more complex frequency response behaviours can be achieved by combining additional force elements, and the resulting potential combinations are vast. One example is presented in FIG. 11A where individual A type and B type elements 962*a*, 962*b* are disposed similarly to the A type and B type elements 862*a*, 862*b* presented in FIG. 10A, but where both these elements are hybrid permanent magnet/electromagnet elements where the electromagnet portion can selectively be turned on, off, or even operated at a reversed polarity, to produce a significant effect on the force response curve. Moreover, another A type element 962*c* having a structure similar to that have been previously presented with reference to FIG. 4A, can be added in the equilibrium position relative to the second magnetic segment 944*b*, and can produce an even sharper slope on the left of the rest position in the corresponding force response curve, in comparison with the force response curve 818 for the embodiment presented in FIG. 10A.

Figure 11B:
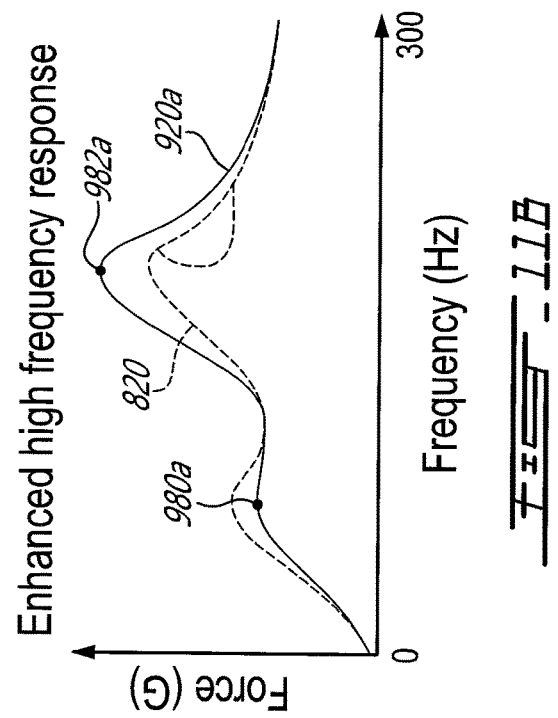
Figure 11A:
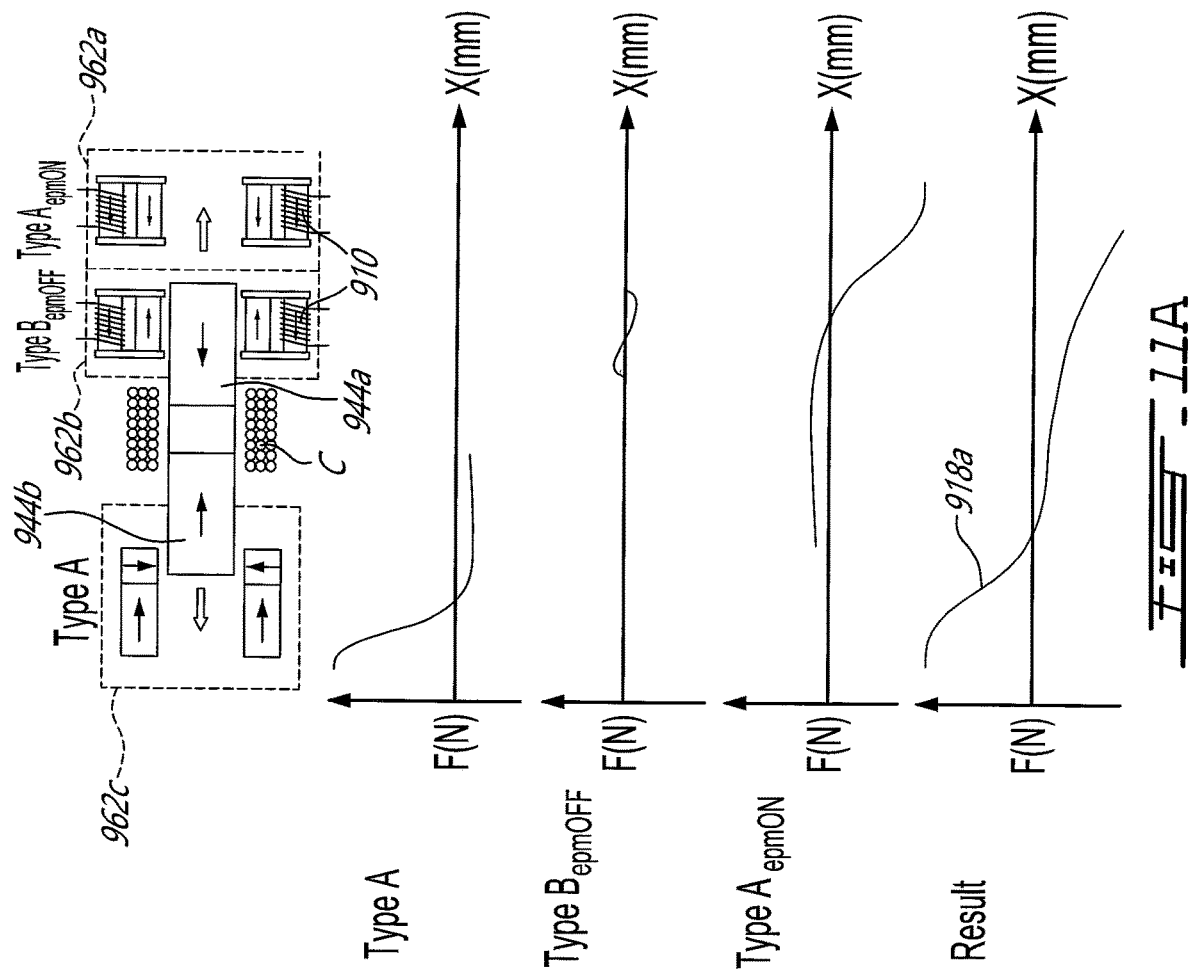

In the variant presented in FIG. 11A, the B type and the A type force elements 962*a*, 962*b* associated to the first magnetized portion 944*a* are a combination of permanent magnets and electromagnets 910. More specifically, each electromagnet 910 can be selectively activated to significantly attenuate, or significantly amplify, the magnetic field of the associated permanent magnet. Accordingly, the force response curve 818 of FIG. 10D is achieved by activating the electromagnets to significantly amplify the magnetic fields of the permanent magnets. In the mode of operation illustrated in FIG. 11A, the polarity of the electromagnet of the B type force element 962*b* can be reversed to essentially cancel out the influence of the B type force element in the overall force response curve 918*a*, while maintaining the original polarity of the electromagnet 910 of the A type force element 962*a*, which can, as represented in FIG. 11B, be used to selectively increase the high frequency response, shown by the increase in amplitude of the high frequency response peak 982*a* at the cost of the amplitude of the lower frequency response peak 980*a*. FIG. 11B shows the frequency response curve 920*a* of the embodiment shown in FIG. 11A in comparison to the frequency response curve 820 previously discussed in relation to FIG. 10E.

FIG. 12A presents another potential mode of operation of the same device, where the polarity of both the electromagnet of the B type force element 962*b* and the electromagnet of the A type force element 962*a* are reversed to cancel out both their individual influence in the overall force response curve 918*b*. Such an approach can produce the effect of strongly increasing the amplitude of the low frequency response peak 980*b* at the cost of the amplitude of the high frequency response peak 982*b*, as presented in the frequency response curve 920*b* presented in FIG. 12B. Such a response can be useful in the context of impact haptics for instance. FIG. 12B show the frequency response curve 920*b* of the embodiment shown in FIG. 12A in comparison to the frequency response curve 820 previously discussed in relation to 10E.

Intermediate effects can be achieved by switching the electromagnet 910 off, or by operating it at intermediary strengths, for instance, instead of fully reversing its polarity.

A number of example alternate embodiments which can achieve suitable force response curves can be provided. In FIG. 13A, for instance, presents an embodiment which could have a behavior somewhat similar to the force response curve of the embodiment presented in FIG. 5F, but with the addition of a supplemental, relatively low force, attractive magnet 1090 at one end of the mass 1012 shown on the left in FIG. 13A, can potentially impart a greater asymmetry, and even a longer span plateau region, in the resulting force response curve. As is seen, there can further be a corresponding opposite supplemental, relatively low force, repellant magnet 1092 at the opposite end of the mass 1012 to further aid in the asymmetry. It is understood that in alternate embodiment, only one of the attractive magnet 1090 or the repellant magnet 1092 can be used without departing from the present disclosure. In the embodiment presented in FIG. 13B, the force response curve acheived is similar to the force response curve offered by the embodiment presented in FIG. 10J, but here, the magnetic element 1011 is only present on a first lateral side of the mass 1012, and is thus not "balanced out". The balancing is effected by the linear guide (not shown). Moreover, the coil 1096 can be oriented transversal to the linear displacement path 1024, instead of by being coiled around it, and still generate a driving force by magnetic coupling with the magnetic segment of the mass 1012. The two latter features can be used individually or combined to modify some of the example embodiments presented herein, for example, without departing from the present disclosure. Still many other potential variants are possible.

Figure 14A:
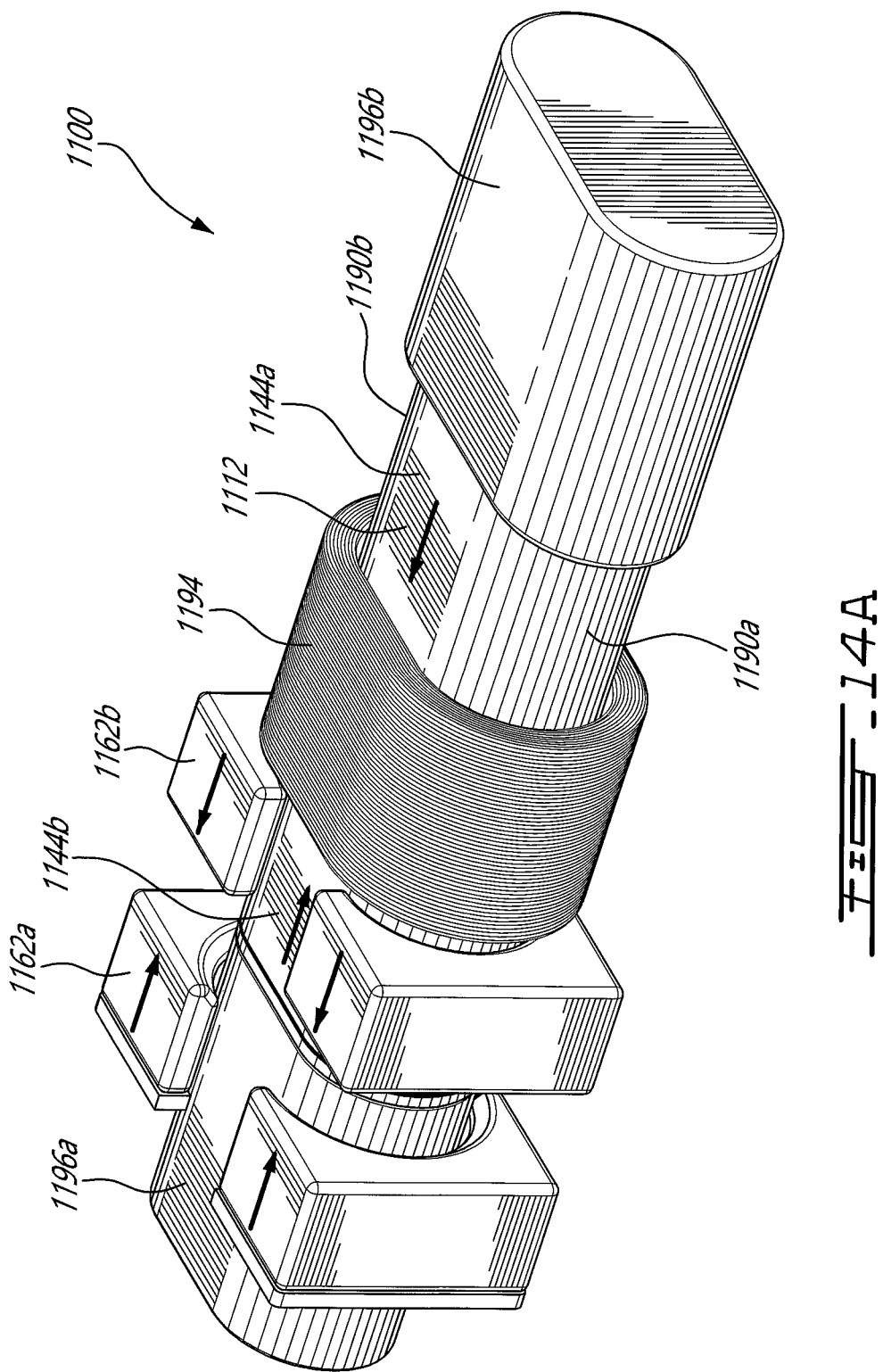
FIG. 14A is an oblique view of an example linear actuator which can exhibit a force response curve such as shown in FIG. 10D, and a frequency response spectrum such as shown in FIG. 10E.
Figure 14B:
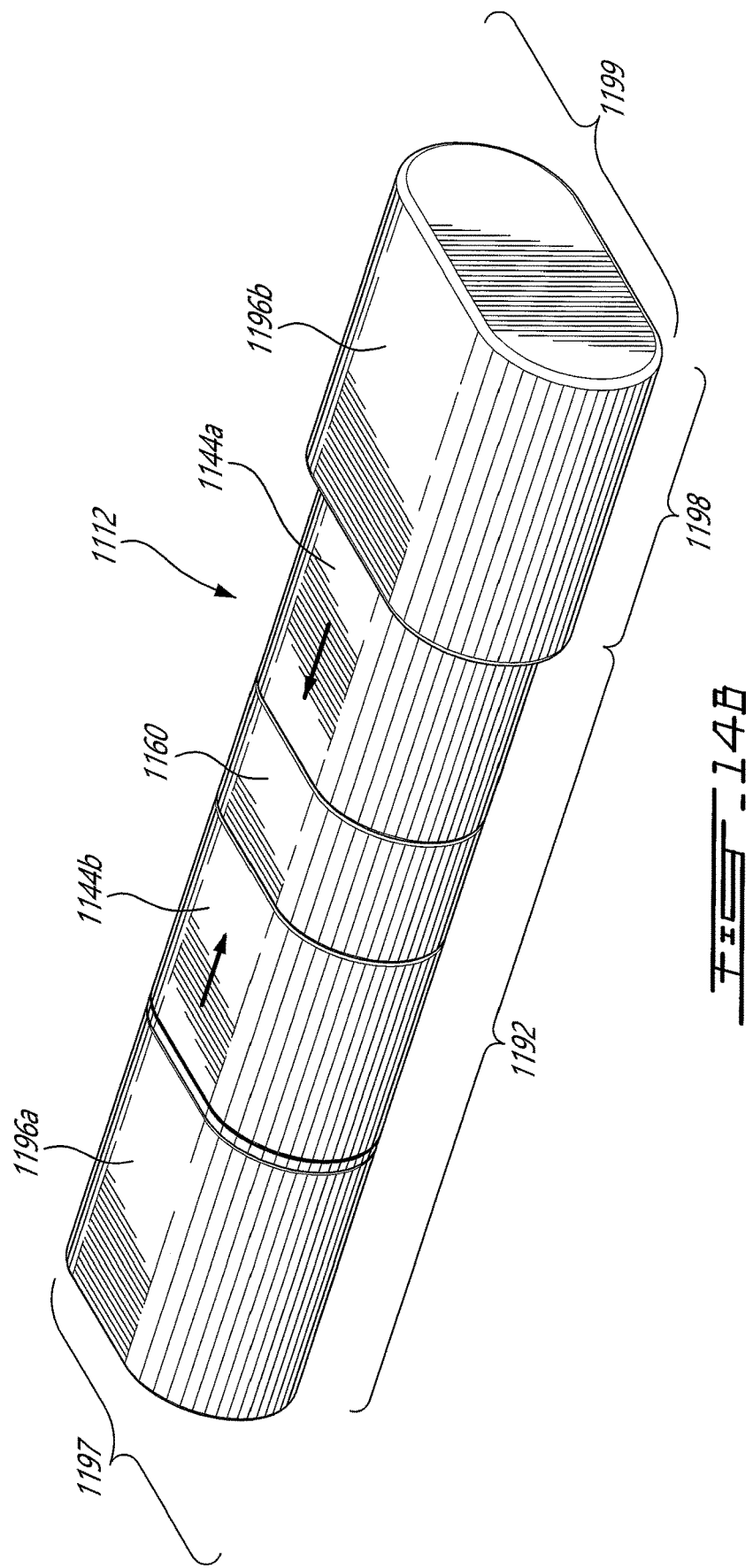
FIG. 14B shows only the mass elements thereof.

FIG. 14A presents an example embodiment of a linear actuator 1100 based generally on the concept of reactive force path presented in FIG. 10A. It will be noted that here the mass 1112 has an obround, or "racetrack" cross-sectional shape and that the A type 1162*a* and B type 1162*b* permanent magnet elements are configured accordingly, at opposite horizontal, transversal sides 1190*a*, 1190*b* of the mass 1112, with concave semi-circular recesses matching the convex semi-circular transversal sides 1190*a*, 1190*b* of the mass 1112. FIG. 14B shows the mass 1112 alone. In this embodiment, a first, longer portion 1192 of the mass 1112 has a sequence of two opposite polarity magnetic segments 1144*a*, 1144*b* spaced apart from one another by a ferromagnetic spacer 1160. At the rest position, illustrated in FIG. 14A, the coil 1194 is transversally aligned, and longitudinally overlaps the ferromagnetic spacer 1160. The first portion 1192 also has a mass segment 1196*a* at one end. The purpose of the mass segment 1196*a* can be both to serve as a guide in collaboration with the magnet force elements 1162*a*, 1162*b*, and to add mass to the mass 1112 for increased force response. The first portion 1192 of the mass 1112 has a first width 1197. In this embodiment, a second portion 1198 of the mass 1112 has a second, larger width 1199 and is entirely formed by a mass segment 1196*b*. The second larger width 1199 can serve as a hard stop in collaboration with a plastic housing which otherwise closely matches the shape of the components (not shown). Keeping the first mass segment 1196*a* narrow, as an extension of, or otherwise part of the first portion 1192, can facilitate assembly by allowing to introduce the mass 1112 into the linear path formed by the coil 1194, and the magnet force elements 1162*a*, 1162*b* into the rest position from the side which has the first, narrower width 1197, for instance.

The two mass segments 1196*a*, 1196*b* can be made of any material desirable for a given application. For instance, in certain embodiments it can be desirable for the material to be optimized such as to have a high density, while avoiding materials which incur high cost. Such materials can be non-ferrous materials, such as tungsten for instance. It is further understood that the mass segments 1196*a*, 196*b* can be made of a plurality of materials engaged with one another and ultimately forming the mass segments 1196*a*, 1196*b*. For instance, it can be desirable in some embodiments for the mass segments to have an inner core made of a high density material, which may have more brittle material properties, for instance, in comparison to an outer layer material, surrounding the inner core material, which is also of a high density material, but has an increased malleability or all around durability in comparison to the core material. It is further understood that the mass segments 1196*a*, 1196*b* can be made of different materials, or have different structures while being made of the same materials without departing from the present disclosure.

FIG. 16 is a schematic view of an electronic device 1200 incorporating a controller 1202 and a linear actuator 1204. The controller 1202 can be used to control the drive force generator of the linear actuator 1204. In an embodiment, the controller 1202 can have some form of processor and some form of memory and can thus be a computer. The controller 1202 can be used to drive a coil element of the linear actuator 1204, for instance, in accordance with drive signals such as previously presented in FIGS. 3B to 3E. In this particular embodiment, the electronic device 1200 is a portable phone 1206 having a screen 1208. It will be understood that the electronic device 1200 can be any other type of electronic device, which may include or omit a screen 1208.

It will be understood that the expression "computer" as used herein is not to be interpreted in a limiting manner. It is rather used in a broad sense to generally refer to the combination of some form of one or more processor and some form of memory accessible by the processor(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processor.

An schematized example of a computer 1300 is presented at FIG. 15 and can be seen to generally include a processor 1302, a memory 1304, and an input/output interface 1306.

A processor 1302 can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory 1304 can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer 1300 can have one or more input/output (I/O) interface 1306 to allow communication with a human user and/or with another computer via an associated input, output, or input/output device such as a keybord, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer 1300 can perform functions or processes via hardware or a combination of both hardware and software. For example, hardware can include logic gates included as part of a silicon chip of a processor. Software (e.g. application, process) can be in the form of data such as computer-readable instructions 1308 stored in a non-transitory computer-readable memory accessible by one or more processing units. With respect to a computer or a processing unit, the expression "configured to" relates to the presence of hardware or a combination of hardware and software which is operable to perform the associated functions.

As will be understood, the examples described above and illustrated are intended to be exemplary only.

Figure 17A:
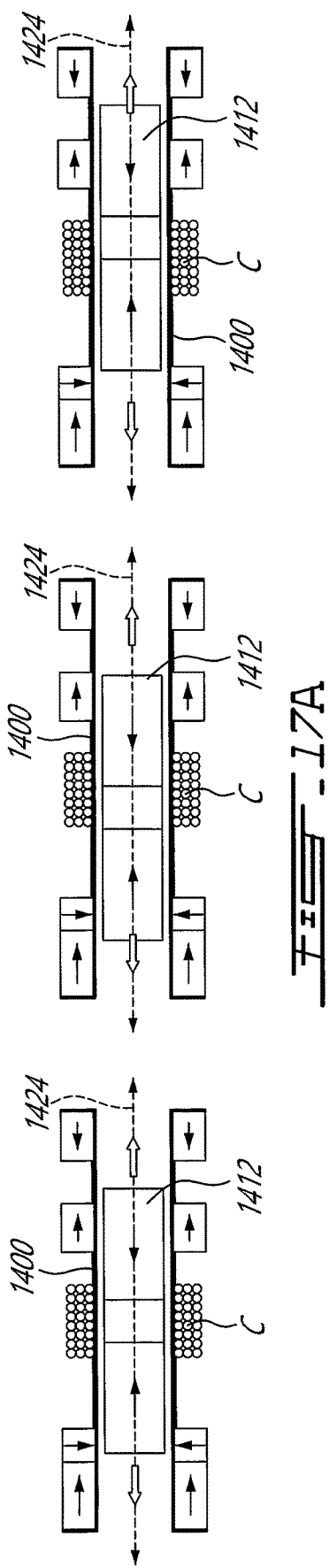

For instance, other types of linear actuators than haptics actuators can benefit from reactive force paths or force elements such as presented above. Moreover, there are many ways of implementing a linear guide which can provide movement ability of the mass along a linear displacement path while also confining the movement ability along the linear displacement path. A few examples are shown in FIGS. 17A to 17D. FIG. 17A shows an example of a sliding guide 1400 where an entire cross-sectional periphery, or dedicated portions thereof, of both the sliding guide 1400 and the mass 1412 are configured to slide relatively snugly relative to one another, along the entire linear displacement path 1424. In such an embodiment, the linear guide 1400, the mass 1412, or both, can have specific adaptations or otherwise a configuration which limits the amount of friction during the sliding movement. Some plastics, such as Teflon for instance, can exhibit such low friction behavior when sliding against some metals. FIG. 17C presents some resemblances with the embodiment of FIG. 17A, but where roller 1406 bearings are used to form a low friction sliding interface between the mass 1412 and the linear guide.

Figure 17B:
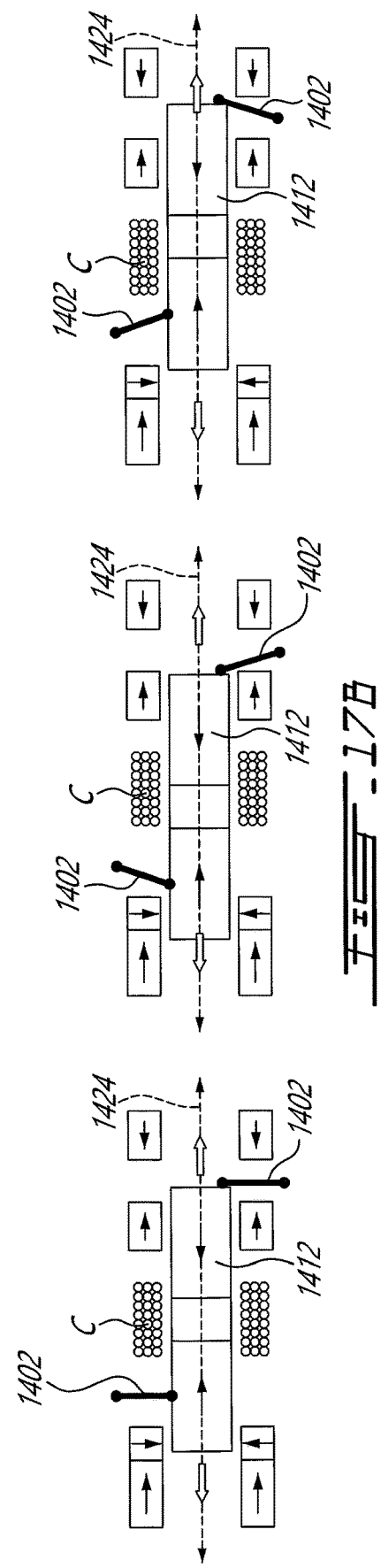

FIG. 17B presents another example where the mass 1412 is "suspended" by a number of distinct flexures 1402 which can be metallic or elastomeric spring elements for instance. The flexures 1402 can resiliently yield upon movement of the mass 1412 along the linear displacement path while otherwise being relatively rigid in terms of maintaining the mass aligned with the linear displacement path 1424. In some embodiments, such "flexures" 1402 can be part of one or more force elements which further contribute to define or define itself the reactive force path and more specifically the force response curve, and may constitute the sole force elements in some embodiments. The embodiment presented in FIG. 17D can bear some resemblances with the embodiment of FIG. 17B, where resilient membranes 1404 can be used instead of resilient flexures 1402. When used in such contexts where they guide and constrain the movement of the mass 1412 along a linear displacement path 1424, flexures 1402 and membranes 1404 can be considered to form one type of linear guide.

It will be noted that in the embodiments illustrated in the appended drawings, the North pole of the magnets are associated to the head of the arrows by convention. It will be understood, however, that in many embodiments, the north poles and the south poles can all be interchanged without significantly affecting the operation of the embodiment.

Accordingly, the scope is indicated by the appended claims.

What is claimed is:

1. A linear actuator comprising a mass movably mounted in a linear displacement path, the mass having a magnetic segment assembly, the magnetic segment assembly having one or more magnetic segments longitudinally separated from one another along the linear displacement path, a drive force generator configured to selectively impart acceleration to the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the reactive force path including a permanent magnet force element disposed transversally adjacent to the linear displacement path and magnetically coupled with the magnetic segment assembly, the permanent magnet force element longitudinally adjacent to the magnetic segment assembly when the mass is at the rest position, the permanent magnet force element having a permanent magnetic field oriented parallel to the linear displacement path, the permanent magnetic field of the permanent magnet force element directed in a same direction as a permanent magnetic field of a closer one of the one or more magnetic segments of the magnetic segment assembly, the magnetic segment assembly having a first magnetic segment and a second magnetic segment longitudinally separated from the first magnetic segment by a spacer of ferromagnetic material, the first and second magnetic segments having corresponding permanent magnetic fields oriented parallel to the linear displacement path and directed opposite one another.

2. The linear actuator of claim 1 wherein the drive force generator is an electromagnet disposed transversally adjacent to the linear displacement path.

3. The linear actuator of claim 2 wherein the magnetic segment assembly has a first magnetic segment and a second magnetic segment longitudinally separated from the first magnetic segment by a spacer of ferromagnetic material, the first and second magnetic segments having corresponding permanent magnetic fields oriented parallel to the linear displacement path and directed opposite one another; wherein the electromagnet is transversally aligned with the spacer when the mass is at the rest position.

4. A linear actuator comprising a mass movably mounted in a linear displacement path, the mass having a magnetic segment assembly, the magnetic segment assembly having one or more magnetic segments longitudinally separated from one another along the linear displacement path, a drive force generator configured to selectively impart acceleration to the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the reactive force path including a first permanent magnet force element disposed transversally adjacent to the linear displacement path and magnetically coupled with the magnetic segment assembly, the first permanent magnet force element longitudinally adjacent to the magnetic segment assembly when the mass is at the rest position, the first permanent magnet force element having a permanent magnetic field oriented parallel to the linear displacement path, the permanent magnetic field of the first permanent magnet force element directed in a same direction as a permanent magnetic field of a closer one of the one or more magnetic segments of the magnetic segment assembly and a second permanent magnet force element having a second permanent magnetic field oriented parallel to the linear displacement path, the second permanent magnet force element being longitudinally adjacent to the magnetic segment assembly when the mass is at the rest position, and the permanent magnetic field of the second permanent magnet force element being directed in a same direction as a permanent magnetic field of a closer one of the one or more magnetic segments of the magnetic segment assembly.

5. A linear actuator comprising a mass movable mounted in a linear displacement path, the mass having a magnetic segment assembly, the magnetic segment assembly having one or more magnetic segments longitudinally separated from one another along the linear displacement path, a drive force generator configured to selectively impart acceleration the mass in the orientation of the linear displacement path, and a reactive force path generating a return force when the mass is displaced from a rest position, the return force being in the orientation of the linear displacement path and towards the rest position, the amplitude of the return force varying as a function of the position of the mass in the linear displacement path in accordance with a force response curve, the reactive force path including a permanent magnet force element disposed transversally adjacent to the linear displacement path and magnetically coupled with the magnetic segment assembly, the permanent magnet force element longitudinally adjacent to the magnetic segment assembly when the mass is at the rest position, the permanent magnet force element having a permanent magnetic field oriented parallel to the linear displacement path, the permanent magnetic field of the permanent magnet force element directed in a same direction as a permanent magnetic field of a closer one of the one or more magnetic segments of the magnetic segment assembly, the permanent magnet force element being a first permanent magnet force element, further comprising a second permanent magnet force element, each permanent magnet force element having a permanent magnetic field oriented parallel to the linear displacement path, the first permanent magnet force element is longitudinally adjacent to the magnetic segment assembly when the mass is at the rest position, and the permanent magnetic field of the first permanent magnet force element is directed in a same direction as a permanent magnetic field of a closer one of the one or more magnetic segments of the magnetic segment assembly, the second permanent magnet force element is transversally aligned with the magnetic segment assembly when the mass is at the rest position, and the permanent magnetic field of the second permanent magnet force element is directed in an opposite direction as the permanent magnetic field of the magnetic segment assembly.

6. The linear actuator of claim 5 wherein the force response curve has regions of increasing return force associated to opposite ends of the linear displacement path, and a plateau region located between the regions of increasing return force.

7. The linear actuator of claim 5 wherein the drive force generator is an electromagnet disposed transversally adjacent to the linear displacement path, wherein the magnetic segment assembly has a first magnetic segment and a second magnetic segment longitudinally separated from the first magnetic segment by a spacer of ferromagnetic material, the first and second magnetic segments having corresponding permanent magnetic fields oriented parallel to the linear displacement path and directed opposite one another; wherein the drive force generator is an electromagnet disposed transversally adjacent to the linear displacement path; and wherein the electromagnet is transversally aligned with the spacer when the mass is at the rest position.

* * * * *